(12) United States Patent
Ookoshi et al.

(10) Patent No.: US 11,059,944 B2
(45) Date of Patent: Jul. 13, 2021

(54) RESIN MOLDED ARTICLE

(71) Applicant: FUJIFILM Business Innovation Corp., Tokyo (JP)

(72) Inventors: Masayuki Ookoshi, Kanagawa (JP); Hiroyuki Moriya, Kanagawa (JP); Shigeru Seitoku, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 24 days.

(21) Appl. No.: 16/273,174

(22) Filed: Feb. 12, 2019

(65) Prior Publication Data

US 2020/0056000 A1    Feb. 20, 2020

(30) Foreign Application Priority Data

Aug. 20, 2018 (JP) .............................. JP2018-154092

(51) Int. Cl.
| | | |
|---|---|---|
| *C08J 5/04* | (2006.01) | |
| *C08J 5/10* | (2006.01) | |
| *C08L 23/26* | (2006.01) | |
| *B29C 70/08* | (2006.01) | |

(52) U.S. Cl.
CPC ............... *C08J 5/042* (2013.01); *C08J 5/043* (2013.01); *C08J 5/10* (2013.01); *C08L 23/26* (2013.01); *B29C 70/086* (2013.01); *C08J 2323/02* (2013.01); *C08J 2467/00* (2013.01); *C08J 2477/00* (2013.01); *C08L 2205/08* (2013.01)

(58) Field of Classification Search
CPC ...................... C08L 23/00–24; C08L 77/00–06
See application file for complete search history.

(56) References Cited

U.S. PATENT DOCUMENTS

| 10,526,486 B2 * | 1/2020 | Miyamoto | .............. B32B 27/34 |
| 2017/0321019 A1 | 11/2017 | Fujita et al. | |
| 2018/0179381 A1 * | 6/2018 | Miyamoto | .............. C08L 23/12 |

FOREIGN PATENT DOCUMENTS

| JP | 2017008332 | 1/2017 |
| JP | 2017149924 | 8/2017 |
| JP | 2018053085 | 4/2018 |
| JP | 2018053089 | 4/2018 |
| JP | 2018053091 | 4/2018 |
| WO | 2018061264 | 4/2018 |

OTHER PUBLICATIONS

Robert F. Fedors., "A method for estimating both the solubility parameters and molar volumes of liquids", Polymer Engineering and Science, Feb. 1974, pp. 147-154.

* cited by examiner

*Primary Examiner* — Ana L. Woodward
(74) *Attorney, Agent, or Firm* — JCIPRNET

(57) ABSTRACT

A resin molded article includes a first resin formed of a polyolefin, reinforcing fibers, a second resin selected from a group consisting of a resin containing at least one of an amide bond and an imide bond, a resin containing an ester bond, and a resin having a linking group containing a sulfur atom, and a compatibilizer. The absolute value of difference in melting temperature between the first resin and the second resin is 130° C. or lower. At least a portion of the second resin forms domains in the first resin. The domains include first domains that do not contain the reinforcing fibers and second domains that contain the reinforcing fibers and that include a coating layer formed of at least a portion of the second resin on the periphery of the reinforcing fibers. The second domains include a second domain A containing one of the reinforcing fibers and a second domain B containing two or more of the reinforcing fibers.

19 Claims, 4 Drawing Sheets

RESIN MOLDED ARTICLE

CROSS-REFERENCE TO RELATED APPLICATIONS

This application is based on and claims priority under 35 USC 119 from Japanese Patent Application No. 2018-154092 filed Aug. 20, 2018.

BACKGROUND

(i) Technical Field

The present disclosure relates to a resin molded article.

(ii) Related Art

Resin molded articles formed of a resin composition containing a thermoplastic resin have been used for components, such as home appliance components, car components, and device housings (e.g., housings for office equipment and electronic/electrical devices).

Japanese Unexamined Patent Application Publication No. 2017-008332 discloses a carbon fiber-reinforced resin composition and a molded article produced by molding the carbon fiber-reinforced resin composition. The carbon fiber-reinforced resin composition contains 100 parts by mass of a polymer alloy (A) containing 25 to 95 mass of one or more of a propylene-based polymer (p) selected from a propylene-ethylene block copolymer, a propylene homopolymer, and a propylene-ethylene random copolymer having an ethylene content of 5 mass % or less, 1 to 60 mass % of an acid-denatured polyolefin resin (m), 0 to 40 mass % of an ethylene-based polymer (e), and 0 to 50 mass of a polyamide (n) (here, the total amount of the component (p), the component (m), the component (e), and the component (n) is 100 mass %) and 1 to 200 parts by mass of carbon fiber (B).

Japanese Patent No. 6012914 discloses a carbon fiber-reinforced resin composition satisfying a specific condition and a molded article produced by molding the carbon fiber-reinforced resin composition. The carbon fiber-reinforced resin composition contains 100 parts by mass of a polymer alloy (A) containing 25 to 95 mass % of one or more of a propylene-based polymer (p) selected from a propylene-ethylene block copolymer, a propylene homopolymer, and a propylene-ethylene random copolymer having an ethylene content of 5 mass % or less, 1 to 60 mass % of an acid-denatured polyolefin resin (m), 0 to 40 mass % of an ethylene-based polymer (e), and 2 to 50 mass % of a polyamide (n) (here, the total amount of the component (p), the component (m), the component (e), and the component (n) is 100 mass %) and 1 to 200 parts by mass of carbon fiber (B).

Japanese Unexamined Patent Application Publication No. 2017-149924 discloses a resin molded article containing a polyolefin, a carbon fiber, a resin containing at least one of an amide bond and an imide bond, and a compatibilizer. The resin containing at least one of an amide bond and an imide bond forms a coating layer on the periphery of the carbon fiber. The thickness of the coating layer is 50 nm or more and 700 nm or less.

Japanese Unexamined Patent Application Publication No. 2018-053085 discloses a resin molded article containing a polyolefin, a carbon fiber, a resin containing at least one of an amide bond and an imide bond, and a compatibilizer. The amount of the resin is more than 20 parts by mass and 100 parts by mass or less relative to 100 parts by mass of the polyolefin.

Japanese Unexamined Patent Application Publication No. 2018-053089 discloses a resin molded article containing a thermoplastic resin, a carbon fiber, a polyamide including a structural unit containing no aromatic rings and a structural unit including an aromatic ring other than an aramid structural unit, and a compatibilizer. The structural unit is obtained by polycondensation of a dicarboxylic acid and a diamine or by ring opening of a lactam. A portion of the polyamide forms a domain having a diameter of 0.1 µm or more and 10 µm or less in the thermoplastic resin.

Japanese Unexamined Patent Application Publication No. 2018-053091 discloses a resin molded article containing a polyolefin, a carbon fiber, a resin containing at least one of an amide bond and an imide bond, and a compatibilizer. The amount of the resin is more than 20 parts by mass and 100 parts by mass or less relative to 100 parts by mass of the polyolefin. A portion of the resin containing at least one of an amide bond and an imide bond forms a domain having a diameter of 0.1 µm or more and 10 µm or less in the polyolefin.

SUMMARY

For example, a resin molded article containing a first resin, such as a polyolefin, reinforcing fibers, such as carbon fibers, a second resin, such as a polyamide, and a compatibilizer, such as an acid-denatured polyolefin resin, has improved mechanical properties, such as flexural modulus, but may have poor cycle fatigue properties (fatigue resistance).

Aspects of non-limiting embodiments of the present disclosure relate to providing a resin molded article containing a first resin formed of a polyolefin, reinforcing fibers, a second resin selected from a group consisting of a resin containing at least one of an amide bond and an imide bond, a resin containing an ester bond, and a resin having a linking group containing a sulfur atom, an absolute value of difference in melting temperature between the first resin and the second resin being 130° C. or lower, and a compatibilizer. At least a portion of the second resin forms domains in the first resin. The domains include first domains that do not contain the reinforcing fibers and second domains that contain the reinforcing fibers and that include a coating layer formed of at least of a portion of the second resin on the periphery of the reinforcing fibers. The second domains include a second domain A containing one of the reinforcing fibers and a second domain B containing two or more of the reinforcing fibers.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a resin molded article containing a first resin formed of a polyolefin, reinforcing fibers, a second resin selected from a group consisting of a resin containing at least one of an amide bond and an imide bond, a resin containing an ester bond, and a resin having a linking group containing a sulfur atom, an absolute value of difference in melting temperature between the first resin and the second resin being 130° C. or lower, and a compatibilizer. At least a portion of the second resin forms domains in the first resin. The domains include first domains that do not contain the reinforcing fibers and second domains that contain the reinforcing fibers and that include a coating layer formed of at least of a portion of the second resin on the periphery of the reinforcing fibers. The second domains include a second domain A containing one of the reinforcing fibers and a second domain B containing two or more of the reinforcing fibers.

BRIEF DESCRIPTION OF THE DRAWINGS

Exemplary embodiments of the present disclosure will be described in detail based on the following figures, wherein.

DETAILED DESCRIPTION

Figure 1:
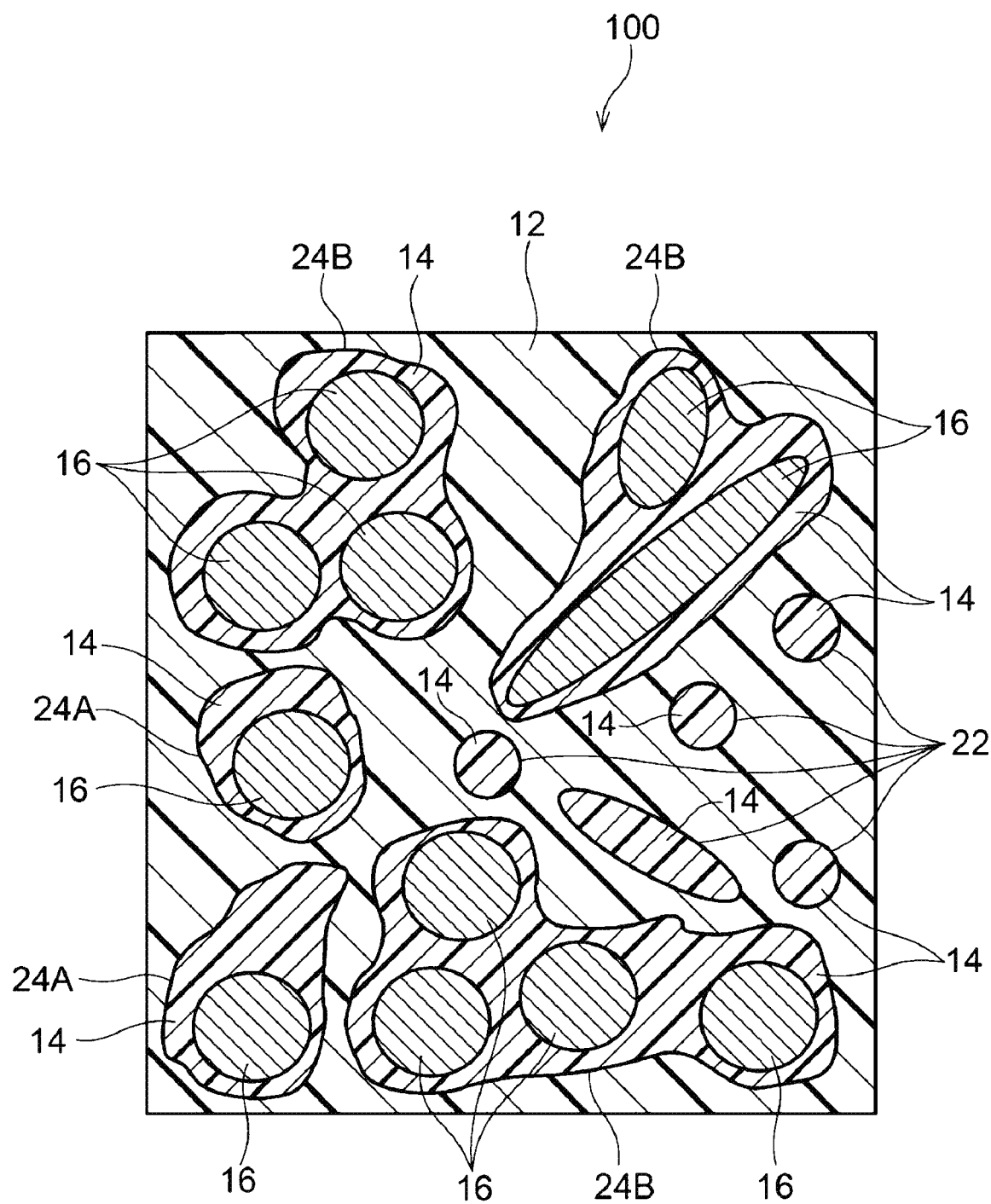
FIG. 1 is a schematic view of an exemplary cross section of a resin molded article according to a present exemplary embodiment.

Hereinafter, a resin molded article according to an exemplary embodiment of the disclosure will be described.
Resin Molded Article A resin molded article according to the present exemplary embodiment will be described. Note that in the present specification, common features and substances in a first exemplary embodiment, a second exemplary embodiment, and a third exemplary embodiment are stated as features and substances according to "the present exemplary embodiment".

The resin molded article according to the present exemplary embodiment contains a first resin formed of a polyolefin, reinforcing fibers, a second resin selected from a group consisting of a resin containing at least one of an amide bond and an imide bond, a resin containing an ester bond, and a resin having a linking group containing a sulfur atom, the absolute value of difference in melting temperature between the first resin and the second resin being 130° C. or lower, and a compatibilizer.

At least a portion of the second resin forms domains in the first resin. The domains include first domains that do not contain the reinforcing fibers and second domains that contain the reinforcing fibers and that include a coating layer formed of at least of a portion of the second resin on a periphery of the reinforcing fibers.

The coating layer preferably covers the entire periphery of the reinforcing fibers, but may partially cover the periphery of the reinforcing fibers.

In the resin molded article according to the first exemplary embodiment, the second domains include a second domain A containing one of the reinforcing fibers and a second domain B containing two or more of the reinforcing fibers.

In the resin molded article according to the second exemplary embodiment, the gel fraction is 10% or more and 60% or less.

In the resin molded article according to the third exemplary embodiment, distribution of distances between the reinforcing fibers has at least two local maximum values.

When the first resin and the second resin, which are used for the resin molded article according to the present exemplary embodiment, do not exhibit a melting point, the glass transition temperature of each resin is used instead of the melting point. Thus, the melting point and glass transition temperature of the resin are collectively referred to as "melting temperature" of the resin in the present specification, as a matter of convenience. In other words, the absolute value of the difference (ΔT) in melting temperature between the first resin and the second resin refers to the absolute value of the difference in melting point (Tm) or glass transition temperature (Tg) between the first resin and the second resin.

When the melting temperature of the second resin is denoted by T2 and the melting temperature of the first resin is denoted by T1, the absolute value |ΔT| of the difference in melting temperature between both resins is expressed by the following formula:

$$|\Delta T| = |T2 - T1|$$

When two or more resins are used in combination in the first resin and the second resin, the melting temperature of the first resin and the melting temperature of the second resin are selected such that the absolute value of the difference in melting temperature between the first resin and the second resin is highest. For example, the absolute value of the difference is calculated from the lowest melting temperature in the first resin and the highest melting temperature in the second resin.

The resin molded article according to the present exemplary embodiment will be described here with reference to FIG. 1. FIG. 1 is a schematic view of an exemplary cross section of the resin molded article according to the present exemplary embodiment. FIG. 1 shows an exemplary cross section of a resin molded article (100), from which the runner has been cut and removed after injection molding. The cross section is near a portion where a runner had been present. FIG. 1 is a schematic view of the cross section of the resin molded article cut in a direction perpendicular to the resin flow direction (injection direction).

As shown in FIG. 1, the resin molded article (100) according to the present exemplary embodiment contains a first resin (12), a second resin (14), and reinforcing fibers (16). The resin molded article (100) further contains a compatibilizer (not shown). A portion of the compatibilizer, which is not shown, binds to a coating layer (e.g., covalent bonding due to a reaction between a functional group of the compatibilizer and a functional group of the second resin, or hydrogen bonding) and is present between the coating layer (i.e., the second resin (14)) and the first resin (12) in a state of being compatible with the first resin (12).

In the resin molded article (100) shown in FIG. 1, at least a portion of the second resin (14) forms domains (22, 24A, and 24B) in the first resin (12), which is the base material (matrix). The domains (22, 24A, and 24B) include first domains (22) containing no reinforcing fibers (16) and second domains (24A and 24B) containing the reinforcing fibers (16). In the second domains (24A and 24B), at least a portion of the second resin (14) forms a coating layer on the periphery of the reinforcing fibers (16). The second domains (24A and 24B) include second domains A (24A) containing one reinforcing fiber (16) and second domains B (24B) containing two or more reinforcing fibers (16).

As shown in FIG. 1, when observed in the cross section of the resin molded article (100), the reinforcing fibers (16) contained in the second domains (24A and 24B) are often oriented in the resin flow direction (injection direction) in the resin molded article (100). However, as shown in FIG. 1, some reinforcing fibers (16) contained in the second domains (24A and 24B) are oriented in various directions, such as a direction intersecting the resin flow direction. As shown in FIG. 1, when observed in a cross section of the resin molded article (100), the first domains (22) have not only a substantially circular shape, but also other shapes, such as an elliptical shape.

Figure 2:
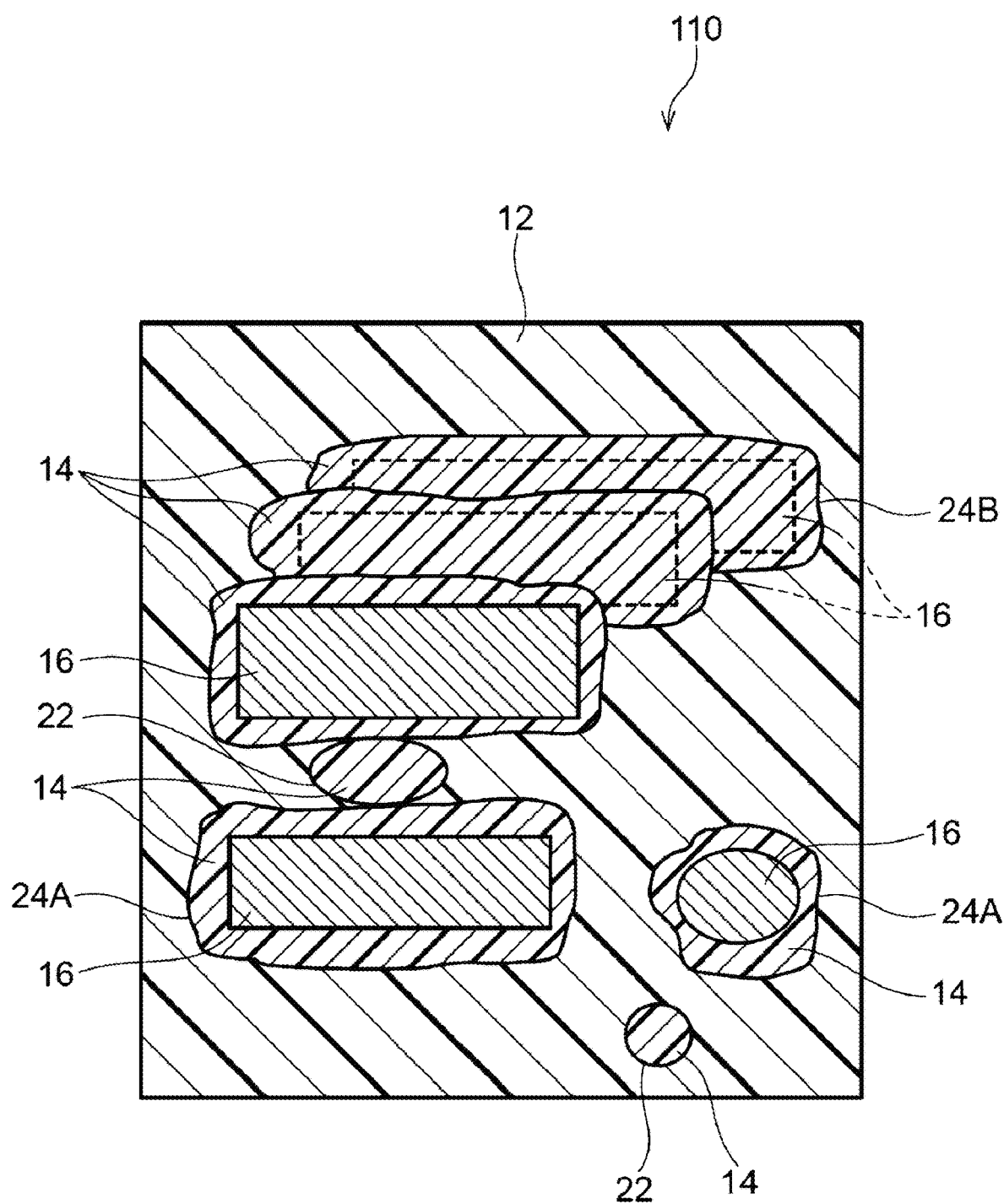
FIG. 2 is a schematic view of another exemplary cross section of the resin molded article according to the present exemplary embodiment.

The resin molded article according to the exemplary embodiment will be described with reference to FIG. 2. FIG. 2 is a schematic view of another exemplary cross section of the resin molded article according to the present exemplary embodiment. FIG. 2 shows a cross section of a resin molded article (110), from which the runner has been cut and removed after injection molding. The cross section is near a portion where a runner had been present. FIG. 2 is a schematic view of the cross section of the resin molded article cut in a direction parallel to the resin flow direction (injection direction).

In the resin molded article (110) shown in FIG. 2, as in the resin molded article (100) shown in FIG. 1, at least a portion of the second resin (14) forms the domains (22, 24A, and 24B) in the first resin (12), which is the base material (matrix). The resin molded article (110) includes the first domains (22) and the second domains (24A and 24B). A portion of the compatibilizer, which is not shown, binds to the second resin and is present between the second resin (14) and the first resin (12) in a state of being compatible with the first resin (12), in the same manner as in the resin molded article (100) shown in FIG. 1.

As shown in FIG. 2, a coating layer formed of the second resin (14) is formed on the periphery of the reinforcing fibers (16) in the second domain B (24B). The reinforcing fibers (16) are ranged with the coating layer disposed therebetween in a thickness direction. The second domains B (24B) and the second domains A (24A) are ranged with the first domain disposed therebetween. As shown in FIG. 2, the resin molded article (110) has a pseudo-cross-linked structure in which the first domains (22), the second domains A (24A), and the second domains B (24B) form a network structure.

As shown in FIG. 2, the resin molded article (110) includes some domains that do not form a pseudo-cross-linked structure. When observed in the cross section of the resin molded article (110), the reinforcing fibers (16) contained in the second domains (24A and 24B) are often oriented in the resin flow direction (injection direction) in the resin molded article (110). However, as shown in FIG. 2, the reinforcing fibers (16) in some second domains (24A and 24B) are oriented in various directions, such as a direction intersecting the observed cross section of the resin molded article.

With reference to FIG. 1 and FIG. 2, the state of the cross section of the resin molded article (100) according to the present exemplary embodiment and the state of the cross section of the resin molded article (110) according to the present exemplary embodiment are described; however, the resin molded article according to the present exemplary embodiment is not limited by the state of the cross section of the resin molded article (100) shown in FIG. 1 or by the state of the cross section of the resin molded article (110) in FIG. 2. The number of the reinforcing fibers (16) contained in the second domains (24A and 24B) is not limited as long as the second domains (24A and 24B) contain at least one reinforcing fiber (16). Resin molded articles according to the second exemplary embodiment and the third exemplary embodiment may include either or both of the second domain A (24A) and second domain B (24B); however, the resin molded articles preferably include both of the second domain A (24A) and the second domain B (24B).

These days, to obtain a resin molded article having excellent mechanical strength, a resin composition containing a polyolefin serving as the base material (matrix) and reinforcing fibers (e.g., carbon fibers) is used. In such a resin composition, if the affinity between the polyolefin and the reinforcing fibers is low, a space may be generated in the interface between the polyolefin and the reinforcing fibers, and thus, the adhesion at the interface may be lowered.

Considering the foregoing, for example, the resin composition containing four constituents such as a polyolefin, reinforcing fibers, a resin containing at least one of an amide bond and an imide bond (hereinafter, may be referred to as "specific resin A"), and a compatibilizer may have high mechanical strength, such as a high flexural modulus.

In the case where the resin molded article is produced by using a resin composition containing the above four constituents, when such a resin composition is melt-kneaded, a polyolefin serving as the base material and a compatibilizer are melted and a portion of the compatibilizer molecule is compatible with an amide bond or an imide bond of a specific resin A molecule, and thus, the specific resin A is dispersed in the resin composition.

Figure 3:
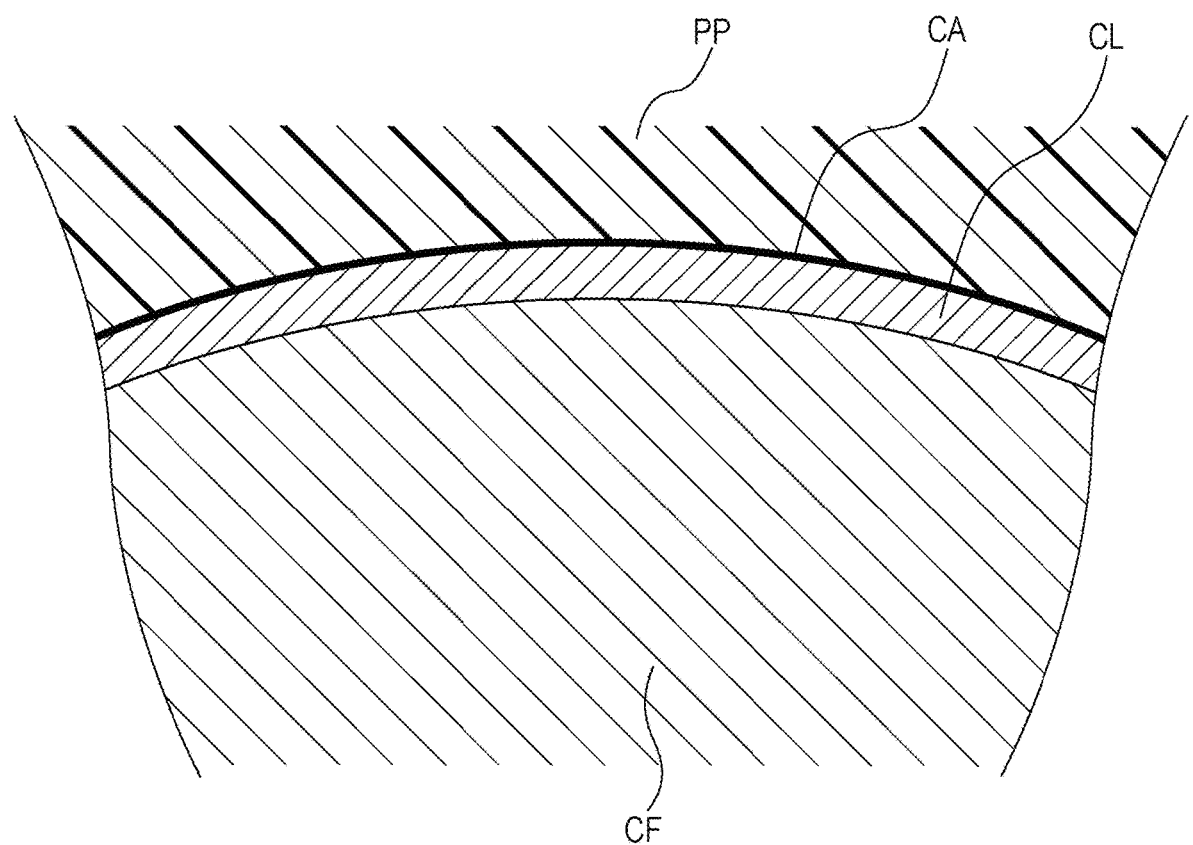
FIG. 3 is a schematic view of an exemplary main portion of the resin molded article according to the present exemplary embodiment.

In such a state, in the case where carbon fibers are used as the reinforcing fibers, when the specific resin A is in contact with the carbon fibers, amide bonds or imide bonds highly present along the molecular chain of the specific resin A and polar groups slightly present on the surface of the carbon fibers are physically bonded to each other at plural portions by affinity (attraction and hydrogen bonding). The compatibility between the polyolefin and the specific resin A is typically low. Thus, due to the repulsion between the polyolefin and the specific resin A, the frequency of contact between the polyolefin and the carbon fibers is decreased. As a result, the amount and area of the specific resin A bonded to the carbon fibers are increased. In such a process, a coating layer formed of the specific resin A is formed on the periphery of the carbon fibers (see FIG. 3). In FIG. 3, PP denotes polyolefin, CF denotes carbon fiber, CL denotes a coating layer, and CA denotes a compatibilizer layer.

The specific resin A forming the coating layer is also compatible with the compatibilizer due to a chemical reaction between a group of the specific resin A and a portion of a group of the compatibilizer molecule and due to an electrostatic interaction between a polar group of the specific resin A and a polar group of the compatibilizer. The compatibilizer is also compatible with the polyolefin, so that equilibrium between attraction and repulsion is established. This enables the coating layer formed of the specific resin A to be formed thin and substantially uniform. In particular, the affinity between a carboxy group on the surface of the carbon fibers and an amide bond or an imide bond of the specific resin A molecule is high. Thus, it is considered that a coating layer formed of the specific resin A is likely to be formed on the periphery of the carbon fibers and that the coating layer is thin and has excellent uniformity.

It has been found, however, that the resin molded article containing four constituents such as a polyolefin, carbon fibers, the specific resin A, and a compatibilizer has improved mechanical properties, such as a flexural modulus, but may have poor cycle fatigue properties.

On the other hand, as described above, the resin molded article according to the present exemplary embodiment contains four constituents such as a first resin, reinforcing fibers, a second resin, and a compatibilizer and further includes first domains that do not contain the reinforcing fibers and second domains that contain the reinforcing fibers and that include a coating layer formed of at least a portion of the second resin on the periphery of the reinforcing fibers.

In the resin molded article according to the first exemplary embodiment, the second domains include the second domain A containing one of the reinforcing fibers and the second domain B containing two or more of the reinforcing fibers. In the second domain B, the reinforcing fibers covered with the second resin are adjacent to each other with the second resin disposed therebetween. Accordingly, the reinforcing fibers are in a bundled state, and plural reinforcing fibers are covered with the second resin. Thus, the second domain B is larger than the first domain and the second domain A. It is considered that the first domain serves as a skeleton in the matrix and that the first domains, the second domains A, and the second domains B are present to be ranged to form a network structure, in other words, such domains form a pseudo-cross-linked structure. It is considered that this improves heat resistance and presumably cycle fatigue properties of the resin molded article according to the first exemplary embodiment.

The term "pseudo-cross-linked structure" indicates a network structure in which the domains are in contact with each other and ranged to be in a state in which the domains appear to be cross-linked with each other.

A resin molded article according to the second exemplary embodiment contains the above four constituents and includes the first domains and the second domains. In addition, the gel fraction is 10% or more and 60% or less in the resin molded article according to the second exemplary embodiment.

It is considered that the gel fraction in such a range indicates that the resin molded article includes a pseudo-cross-linked structure in which the first domains and the second domains form a network structure. It is also considered that formation of a pseudo-cross-linked structure by the first domains and the second domains improves heat resistance and presumably cycle fatigue properties of the resin molded article according to the second exemplary embodiment.

A resin molded article according to the third exemplary embodiment contains the above four constituents and includes the first domains and the second domains. In addition, the distribution of distances between the reinforcing fibers has at least two local maximum values. The presence of at least two local maximum values in the distribution of distances between the reinforcing fibers indicates that the distances between the reinforcing fibers are not equal. The non-equality of the distances between the reinforcing fibers indicates that there are some portions in which the reinforcing fibers are ranged and other portions in which the reinforcing fibers are separated from each other. It is considered that the distribution of distances between the fibers having two or more local maximum values indicates that the resin molded article has a pseudo-cross-linked structure in which the first domains and the second domains form a network structure. It is also considered that formation of a pseudo-cross-linked structure by the first domains and the second domains improves heat resistance and presumably cycle fatigue properties of the resin molded article according to the third exemplary embodiment. When a specific resin A (e.g., polyamide), a resin containing an ester bond (e.g., polyester), and/or a resin having a linking group containing a sulfur atom (e.g., polyphenylene sulfide or polyethersulfone) is used as the second resin, the resin molded article is considered to have an effect similar to the above effect. When the reinforcing fibers are fibers other than carbon fibers, the resin molded article is considered to have an effect similar to the above effect.

Accordingly, it is presumed that the above configurations improve cycle fatigue properties of the resin composition according to the present exemplary embodiment.

The resin molded article according to the present exemplary embodiment preferably has a structure in which a coating layer formed of the second resin is formed on the periphery of the reinforcing fibers and has a thickness of 5 nm or more and 700 nm or less. When the coating layer has a thickness of 5 nm or more (particularly, 10 nm or more), the flexural modulus may be improved. When the coating layer has a thickness of 700 nm or less, weakening of the interface between the reinforcing fiber and the first resin, which are adjacent to each other with the coating layer disposed therebetween, may be suppressed, and thus, degradation of the flexural modulus is likely to be suppressed. From the viewpoint of further improving the flexural modulus, the coating layer preferably has a thickness of 10 nm or more and 650 nm or less. When the coating layer has a thickness of 5 nm or more and 700 nm or less, cycle fatigue properties are likely to be improved.

The thickness of the coating layer is a value measured by the following method. A measurement object is fractured in liquid nitrogen, and a cross section of the object is observed under an electron microscope (VE-9800, manufactured by KEYENCE CORPORATION). The thickness of the coating layer covering the periphery of the carbon fibers is measured at 100 points in the cross section, and the average is calculated. The presence of the coating layer is confirmed by the observation of the cross section.

In the resin molded article according to the present exemplary embodiment, for example, the compatibilizer is present between the coating layer and the first resin and is partially compatible therewith.

Specifically, for example, a compatibilizer layer may be present between the coating layer formed of the specific resin A and the first resin, which is the base material (see FIG. 3). In other words, a compatibilizer layer may be formed on the surface of the coating layer, and the coating layer and the first resin may be adjacent to each other with the compatibilizer layer disposed therebetween. The compatibilizer layer is formed thinner than the coating layer. The presence of the compatibilizer layer enhances adhesion (adhesiveness) between the coating layer and the first resin, and thus, a resin molded article having high mechanical strength, particularly a high flexural modulus, is likely to be obtained. In FIG. 3, PP denotes polyolefin (first resin), CF denotes carbon fiber, CL denotes a coating layer, and CA denotes a compatibilizer layer.

In particular, the compatibilizer layer may be present between the coating layer and the first resin in a state of binding to the coating layer (e.g., covalent bonding due to a reaction between a functional group of the compatibilizer and a functional group of the specific resin A, or hydrogen bonding) and in a state of being compatible with the first resin. This configuration is likely to be obtained, for example, when a compatibilizer that has the same structure as the first resin, which is the base material, or that has a structure compatible with the first resin and that has a portion in the molecule thereof that reacts with the above-described functional group of the specific resin A is used.

Specifically, for example, when a polyolefin, a polyamide used as the second resin, and a maleic anhydride-modified polyolefin used as the compatibilizer are used, the maleic anhydride-modified polyolefin layer (compatibilizer layer) may be present in a state in which carboxy groups generated by ring-opening of a maleic-anhydride portion of the maleic anhydride-modified polyolefin react with and bind to amine residues of the polyamide layer (coating layer) and in which a polyolefin portion of the maleic anhydride-modified polyolefin is compatible with the polyolefin.

A method for confirming the presence of the compatibilizer layer between the coating layer and the first resin is as follows.

A micro-infrared spectrometer (IRT-5200, manufactured by JASCO Corporation) is used as an analyzer. For example, a piece is sliced from a resin molded article formed of a polypropylene (hereinafter, PP) used as the first resin, PA66 used as the specific resin A, and a maleic anhydride-denatured polypropylene (hereinafter, MA-PP) used as the modified polyolefin, and the cross section of the piece is observed. IR mapping of a coating layer portion on the periphery of the cross section of the reinforcing fibers (e.g., carbon fibers) is performed, and the presence of maleic anhydride ($1820$ $cm^{-1}$ or more and $1750$ $cm^{-1}$ or less) derived from the coating layer-compatibilizer layer is observed. Accordingly, the presence of the compatibilizer layer (binding layer) between the coating layer and the first resin may be confirmed. More specifically, when MA-PP and PA66 react with each other, a maleic anhydride ring portion of MA-PP opens and chemically binds to an amine residue of PA66, and thus, the number of the maleic anhydride ring portions is decreased. Therefore, it may be confirmed that the compatibilizer layer (binding layer) is present between the coating layer and the first resin.

In each of cases such as a case where a resin containing an ester bond (e.g., polyester) and a resin having a linking group containing a sulfur atom (e.g., polyphenylene sulfide or polyethersulfone) are used as the second resin, a case where glass fibers are used as the reinforcing fibers, and a case where a maleic anhydride-denatured SEBS (e.g., Kraton FG polymer) or a glycidyl-denatured MMA (e.g., MODIPER A4300) is used as a compatibilizer, a compatibilizer layer may be observed by the above-described method.

Hereinafter, constituents of the resin molded article according to the present exemplary embodiment will be described in detail.

First Resin (A)

The first resin is formed of polyolefin. The first resin (also referred to as a matrix resin) is a constituent serving as the base material of the resin molded article and is a resin constituent reinforced by reinforcing fibers.

Polyolefins may be used alone or in a combination of two or more.

The polyolefin is a resin including a repeating unit derived from an olefin and may include a repeating unit derived from a monomer other than an olefin as long as the amount of such a repeating unit is 30 mass or less relative to the total amount of resin.

The polyolefin is obtained by addition polymerization of olefins (if necessary, monomers other than olefins).

Olefins may be used alone or in a combination of two or more to produce the polyolefin. Monomers other than olefins may be used alone or in a combination of two or more to produce the polyolefin.

The polyolefin may be a copolymer or a homopolymer. The polyolefin may be linear or branched.

Examples of the olefins include linear and branched aliphatic olefins and alicyclic olefins.

Examples of the aliphatic olefins include α-olefins, such as ethylene, propylene, 1-butene, 1-hexene, 4-methyl-1-pentene, 1-octene, 1-decene, 1-hexadecene, and 1-octadecene.

Examples of the alicyclic olefins include cyclopentene, cycloheptene, norbornene, 5-methyl-2-norbornene, tetracyclododecene, and vinylcyclohexane.

Among such compounds, from the viewpoint of reducing the cost, α-olefins are preferable, ethylene and propylene are more preferable, and propylene is particularly preferable.

The monomer other than an olefin is selected from known addition-polymerizable compounds.

Examples of the addition-polymerizable compounds include styrenes, such as styrene, methylstyrene, α-methylstyrene, β-methylstyrene, t-butylstyrene, chlorostyrene, chloromethylstyrene, methoxystyrene, and styrenesulfonic acid and salts thereof; (meth)acrylates, such as alkyl (meth)acrylate, benzyl (meth)acrylate, and dimethylaminoethyl (meth)acrylate; halovinyls, such as vinyl chloride; vinyl esters, such as vinyl acetate and vinyl propionate; vinyl ethers, such as vinyl methyl ether; vinylidene halides, such as vinylidene chloride; and N-vinyl compounds, such as N-vinyl pyrrolidone.

Preferable examples of the polyolefin include polypropylene (PP), polyethylene (PE), polybutene, polyisobutylene, a coumarone-indene resin, a terpene resin, and an ethylene-vinyl acetate copolymer resin (EVA).

Among such compounds, a resin containing only a repeating unit derived from an olefin is preferable. From the viewpoint of reducing the cost, polypropylene is particularly preferable.

The molecular weight of the polyolefin is not particularly limited and may be determined according to resin types, molding conditions, and applications of the resin molded article. For example, the weight average molecular weight (Mw) of the polyolefin is preferably 10,000 or more and 300,000 or less and more preferably 10,000 or more and 200,000 or less.

As with the molecular weight, the glass transition temperature (Tg) or melting point (Tm) of the polyolefin is not particularly limited and may be determined according to resin types, molding conditions, and applications of the resin molded article. For example, the melting point (Tm) of the polyolefin is preferably 100° C. or higher and 300° C. or lower and more preferably 150° C. or higher and 250° C. or lower.

The weight average molecular weight (Mw) and melting point (Tm) of the polyolefin are values measured by the following method.

The weight average molecular weight (Mw) of the polyolefin is measured by gel permeation chromatography (GPC) under the following conditions. The GPC apparatus is a high-temperature GPC system "HLC-8321GPC/HT", and the eluent is o-dichlorobenzene. The polyolefin is melted in o-dichlorobenzene at a high temperature (a temperature of 140° C. or higher and 150° C. or lower) and filtrated, and the filtrate is used as a measurement sample. The measurement is performed with an RI detector under the following measuring conditions: sample concentration 0.5%, flow rate 0.6 ml/min, and sample injection volume 10 μl. The calibration curve is prepared by using 10 samples of "TSKgel Standard Polystyrene", manufactured by Tosoh Corporation: "A-500", "F-1", "F-10", "F-80", "F-380", "A-2500", "F-4", "F-40", "F-128", and "F-700".

The glass transition temperature (Tg) or melting point (Tm) of the polyolefin is determined from a DSC curve obtained by differential scanning calorimetry (DSC) by using a "melting-peak temperature" described in the method for determining melting temperature in JIS K 7121-1987, "Testing Methods for Transition Temperatures of Plastics".

The amount of polyolefin may be determined according to, for example, applications of the resin molded article. For example, the amount of polyolefin is preferably 5 mass % or more and 95 mass % or less, more preferably 10 mass % or more and 95 mass % or less, and still more preferably 20 mass % or more and 95 mass % or less relative to the total amount of resin molded article.

Reinforcing Fiber

Known reinforcing fiber used for resin molded articles may be used as the reinforcing fiber. Examples of the reinforcing fiber include carbon fiber, glass fiber, metal fiber, and aramid fiber.

Such reinforcing fibers may be used alone or in a combination of two or more.

Among such fibers, from the viewpoint of high affinity for the specific resin A and from the viewpoint of further improving the flexural modulus, carbon fiber is preferable.

Carbon fiber has a carboxyl group on the surface thereof. The carboxyl group and an amide bond or an imide bond of the specific resin A molecule may form a hydrogen bond, so that a high affinity may be exhibited. Therefore, it is considered that a coating layer formed of the specific resin A is likely to be formed on the periphery of the carbon fibers and that the flexural modulus is further improved.

Known carbon fiber, such as polyacrylonitrile (PAN)-based carbon fiber or pitch-based carbon fiber, may be used as the carbon fiber.

The reinforcing fiber may have been subjected to known surface treatment.

In the case where the reinforcing fiber is carbon fiber, examples of the surface treatment include oxidation treatment and sizing treatment.

The fiber diameter and fiber length of the reinforcing fiber is not particularly limited and may be selected according to applications of the resin molded article.

The average fiber length of the reinforcing fibers in the resin molded article may be 0.1 mm or more and 5.0 mm or less (preferably 0.2 mm or more and 2.0 mm or less and more preferably 0.2 mm or more and 1.0 mm or less).

For example, in the case where the reinforcing fiber is carbon fiber in the resin molded article, the average diameter of the reinforcing fibers may be 5.0 μm or more and 10.0 μm or less (preferably 6.0 μm or more and 8.0 μm or less). The fiber orientation in the resin molded article is 0 degrees or more and 30 degrees or less and preferably 0.1 degrees or more and 20 degrees or less relative to the injection direction. The fiber orientation may be measured with a fiber-orientation X-ray CT (inspeXio SMX-225CT, manufactured by Shimadzu Corporation).

The method for measuring the average fiber length of the reinforcing fibers is as follows. The reinforcing fibers are observed under a light microscope at a magnification of 100× to measure the length of the reinforcing fibers. The length of 200 carbon fibers is measured as described above, and the average value of the lengths is determined to be the average fiber length of the reinforcing fibers.

On the other hand, the method for measuring the average diameter of the reinforcing fibers is as follows. A cross section perpendicular to the direction of the reinforcing fiber length is observed under a scanning electron microscope (SEM) at a magnification of 1,000× to measure the reinforcing fiber diameter. The diameter of 100 reinforcing fibers is measured as described above, and the average value of the diameters is determined to be the average diameter of the reinforcing fibers.

Furthermore, the form of the reinforcing fiber is not particularly limited and may be selected according to a method for molding the resin molded article and applications of the resin molded article. Examples of the form of the reinforcing fiber include a short fiber, a long fiber, a single fiber, a fiber bundle formed of a large number of single fibers, a bundle of fiber bundles, fabric produced by weaving fibers two-dimensionally or three-dimensionally, and fiber bundles arranged in a sheet-like structure.

A commercially available fiber may be used as the reinforcing fiber (e.g., carbon fiber).

Examples of a commercially available product of the PAN-based carbon fiber include "TORAYCA (trade name)" manufactured by Toray Industries, Inc., "Tenax" manufactured by Toho Tenax Co., Ltd., and "Pyrofil (trade name)" manufactured by Mitsubishi Chemical Corporation. Other examples of a commercially available product of the PAN-based carbon fiber include PAN-based carbon fibers manufactured by Hexcel Corporation, Cytec Industries Inc., DowAksa, Formosa Plastics Corporation, and SGL Carbon SE.

Examples of a commercially available product of the pitch-based carbon fiber include "DIALEAD (trade name)" manufactured by Mitsubishi Chemical Corporation, "GRANOC" manufactured by Nippon Graphite Fiber Corporation, and "KRECA" manufactured by KUREHA CORPORATION. Other examples of a commercially available product of the pitch-based carbon fiber include pitch-based carbon fibers manufactured by Osaka Gas Chemicals Co., Ltd. and Cytec Industries Inc.

Second Resin

The second resin is selected from a group consisting of a resin containing at least one of an amide bond and an imide bond (specific resin A), a resin containing an ester bond (hereinafter, may be referred to as "specific resin B"), and a resin having a linking group containing a sulfur atom (hereinafter, may referred to as "specific resin C"). The second resin includes a specific partial structure and may cover the periphery of the reinforcing fibers, as described above.

The absolute value of the difference in melting temperature between the second resin and the first resin is 130° C. or lower, regardless of the melting temperature of the second resin. The difference in melting temperature between the second resin and the first resin is 130° C. or lower, so that the difference in flowability between the first resin and the second resin is decreased, and thus, moldability at low temperature may be improved. From the viewpoint of further improving moldability at low temperature, the difference in melting temperature between the second resin and the first resin is preferably 0° C. or higher and 100° C. or lower, more preferably 0° C. or higher and 80° C. or lower, and still more preferably 0° C. or higher and 60° C. or lower.

The second resin may contain one resin or two or more resins in combination as long as the absolute value of the difference in melting temperature between the first resin and the second resin is 130° C. or lower.

The glass transition temperature (Tg) or melting point (Tm) of the first resin is measured as described above. The glass transition temperature (Tg) or melting point (Tm) of the second resin is measured by the method the same as the above-described method for measuring the melting point of the first resin (i.e., polyolefin). In other words, the glass transition temperature (Tg) or melting point (Tm) of the second resin is determined from a DSC curve obtained by differential scanning calorimetry (DSC) by using a "melting-peak temperature" described in the method for determining melting temperature in JIS K 7121-1987, "Testing Methods for Transition Temperatures of Plastics".

The second resin preferably has low compatibility with the first resin. Specifically, the second resin preferably has a solubility parameter (SP value) that differs from that of the first resin.

From the viewpoint of the compatibility and repulsion between the first resin and the second resin, the difference in SP value between the first resin and the second resin is preferably 3 or more and more preferably 3 or more and 6 or less.

The SP value here is calculated by Fedors' method. Specifically, a solubility parameter (SP value) is calculated by the following formula in conformity with, for example, a description in Polym. Eng. Sci., vol. 14, p. 147 (1974):

$$SP \text{ value} = \sqrt{(Ev/v)} = \sqrt{(\Sigma\Delta ei/\Sigma\Delta vi)}$$

(In the formula, Ev: evaporation energy (cal/mol), v: molar volume (cm$^3$/mol), $\Delta ei$: evaporation energy of each atom or each atom group, and $\Delta vi$: molar volume of each atom or each atom group)

The unit of the solubility parameter (SP value) is (cal/cm$^3$)$^{1/2}$; however, according to practice, the unit is omitted, and the solubility parameter is expressed as a dimensionless parameter.

First, hereinafter, a resin containing at least one of an amide bond and an imide bond (specific resin A) will be described in detail as the second resin.

The specific resin A contains at least one of an imide bond and an amide bond in the molecule thereof.

The specific resin A contains an imide bond or an amide bond, and an affinity is exhibited between the imide bond or the amide bond and a polar group on the surface of the reinforcing fibers (e.g., carbon fibers).

Specific examples of the specific resin A include the first resin containing at least one of an imide bond and an amide bond in the main chain thereof, such as polyamide (PA), polyimide (PI), polyamideimide (PAI), polyetherimide (PEI), and polyamino acid.

The specific resin A preferably has low compatibility with the first resin and a SP value that differs from that of the first resin.

From the viewpoint of excellent moldability at low temperature, further improvement of the flexural modulus, and excellent adhesion to the carbon fiber, the specific resin A is preferably a polyamide (PA).

Examples of the polyamide include polyamides obtained by co-polycondensation of a dicarboxylic acid and a diamine and polyamides obtained by polycondensation of a lactam. In other words, the polyamide includes at least one of a structural unit obtained by co-polycondensation of a dicarboxylic acid and a diamine and a structural unit in which a lactam ring has opened.

Examples of the dicarboxylic acid include oxalic acid, adipic acid, suberic acid, sebacic acid, terephthalic acid, isophthalic acid, 1,4-cyclohexanedicarboxylic acid, malonic acid, succinic acid, glutaric acid, pimelic acid, azelaic acid, and phthalic acid. Among such compounds, adipic acid and terephthalic acid are preferable.

Examples of the diamine include ethylenediamine, pentamethylenediamine, hexamethylenediamine, nonanediamine, decamethylenediamine, 1,4-cyclohexanediamine, p-phenylenediamine, m-phenylenediamine, and m-xylenediamine. Among such compounds, hexamethylenediamine is preferable.

Examples of the lactam include ε-caprolactam, undecanelactam, and lauryl lactam. Among such compounds, ε-caprolactam is preferable.

The above dicarboxylic acids may be used alone or in a combination of two or more. The above diamines may be used alone or in a combination of two or more. The above lactams may be used alone or in a combination of two or more.

The polyamide may be at least one of aromatic polyamides and aliphatic polyamides.

Examples of the aromatic polyamide include MXD6 (polycondensate of adipic acid and m-xylenediamine; melting point 237° C.), nylon 6T (polycondensate of terephthalic acid and hexamethylenediamine; melting point 310° C.), and nylon 9T (polycondensate of terephthalic acid and nonanediamine; melting point 306° C.)

Examples of a commercially available product of the aromatic polyamide include "MXD6" manufactured by MITSUBISHI GAS CHEMICAL COMPANY, INC., "GENESTAR (trade name): PA6T" manufactured by KURARAY CO., LTD., "GENESTAR (trade name): PA9T" manufactured by KURARAY CO., LTD., and "TY-502NZ: PA6T" manufactured by Toyobo Co., Ltd.

Examples of the aliphatic polyamide include nylon 6 (ring-opening polycondensate of ε-caprolactam; melting point 225° C.), nylon 11 (ring-opening polycondensate of undecanelactam; melting point 185° C.), nylon 12 (ring-opening polycondensate of lauryl lactam; melting point 175° C.), nylon 66 (polycondensate of adipic acid and hexamethylenediamine; melting point 260° C.), nylon 610 (polycondensate of sebacic acid and hexamethylenediamine; melting point 225° C.), and nylon 612 (polycondensate of caprolactam (6 carbon atoms) and lauryl lactam (12 carbon atoms): melting point 220° C.).

Examples of a commercially available product of the aliphatic polyamide include "Zytel (trade name): 7331J (PA6)" manufactured by DuPont and "Zytel (trade name): 101L (PA66)" manufactured by DuPont.

In the case where the first resin is polypropylene, the polyamide preferably contains at least one selected from a group consisting of MXD6, nylon 6, and nylon 12, among the above polyamides.

In the case where the first resin is polyethylene, the polyamide preferably contains at least one selected from a group consisting of nylon 12, nylon 11, and MXD6.

Physical properties of the specific resin A will be described.

The molecular weight of the specific resin A is not particularly limited. The specific resin A may be more likely to be melted than the first resin present with the specific resin A in the resin molded article. In the case where the specific resin A is a polyamide, for example, the weight average molecular weight of the polyamide is preferably 10,000 or more and 300,000 or less and more preferably 10,000 or more and 100,000 or less.

The glass transition temperature or melting point of the specific resin A is not particularly limited as long as the absolute value of the difference in melting temperature between the specific resin A and the first resin is within the above-described range. The specific resin A may be more likely to be melted than the first resin present with the specific resin A in the resin molded article. In the case where the specific resin A is polyamide, for example, the glass transition temperature or melting point of the polyamide is preferably 100° C. or higher and 400° C. or lower, more preferably 150° C. or higher and 350° C. or lower, still more preferably 150° C. or higher and 250° C. or lower, and most preferably 160° C. or higher and 240° C. or lower.

Next, a resin containing an ester bond (specific resin B) will be described as the second resin. The specific resin B contains an ester bond in the molecule thereof. The specific resin B contains an ester bond, and an affinity is exhibited between the ester bond and a polar group on the surface of the reinforcing fibers (e.g., carbon fibers). Accordingly, it is considered that at least a portion of the specific resin B forms a coating layer on the periphery of the reinforcing fibers.

The specific resin B may be any resin having an ester bond in the molecule thereof. Specific examples of the specific resin B include thermoplastic resins having an ester bond in the main chain thereof, such as polyesters and polycarbonates. The resin having an ester bond is preferably a polyester. The polyester may be an aliphatic polyester or an aromatic polyester. For example, the polyester may be a polycondensate of a polyol and a polycarboxylic acid. The polyester may be a commercially available polyester or a synthesized polyester. The specific resin B may contain one or two or more of such compounds.

Examples of the polycarboxylic acid include aliphatic dicarboxylic acids (e.g., oxalic acid, malonic acid, maleic acid, fumaric acid, citraconic acid, itaconic acid, glutaconic acid, succinic acid, alkenyl succinic acid, adipic acid, and sebacic acid), alicyclic dicarboxylic acids (e.g., cyclohexanedicarboxylic acid), and aromatic dicarboxylic acids (e.g., terephthalic acid, isophthalic acid, phthalic acid, and naphthalenedicarboxylic acid), and anhydrides and lower alkyl esters (e.g., one or more and five or less carbon atoms) thereof. Among such compounds, for example, an aromatic dicarboxylic acid is preferable as the polycarboxylic acid.

A dicarboxylic acid and a carboxylic acid that has three or more carboxy groups and that has a cross-linked structure or a branched structure may be used together. Examples of the carboxylic acid having three or more carboxy groups include trimellitic acid and pyromellitic acid, and anhydrides and lower alkyl esters (e.g., one or more and five or less carbon atoms) thereof.

The polycarboxylic acids may be used alone or in a combination of two or more.

Examples of the polyol include aliphatic diols (e.g., ethylene glycol, diethylene glycol, triethylene glycol, propylene glycol, butanediol, hexanediol, and neopentyl glycol), alicyclic diols (e.g., cyclohexanediol, cyclohexanedimethanol, and hydrogenated bisphenol A), and aromatic diols (e.g., a bisphenol A-ethylene oxide adduct and a bisphenol A-propylene oxide adduct). Among such compounds, for example, an aromatic diol and an alicyclic diol are preferable, and an aromatic diol is more preferable as the polyol.

A diol and a polyol that has three or more hydroxy groups and that has a cross-linked structure or a branched structure may be used together. Examples of the polyol having three or more hydroxy groups include glycerol, trimethylolpropane, and pentaerythritol.

The polyols may be used alone or in a combination of two or more.

The polyester resin is produced by a known production method. Specifically, for example, the polyester resin is produced by a reaction performed at a polymerization temperature of 180° C. or higher and 230° C. or lower and, if necessary, under a reduced pressure, while water and alcohol generated during the reaction is removed.

When a raw material monomer does not dissolve or is not compatible at a reaction temperature, a solvent having a high boiling point may be added as a solubilizer to dissolve the raw material monomer. In this case, the polycondensation reaction is performed while the solubilizer is evaporated. When a monomer having low compatibility is present, the monomer having low compatibility may be previously condensed with an acid or an alcohol that is to be subjected to polycondensation with the monomer and thereafter, subjected to polycondensation with the main constituent.

Specific examples of the polyester include polyethylene terephthalate (PET) and polybutylene terephthalate (PBT). Among such compounds, polybutylene terephthalate (PBT) is preferable.

Examples of a commercially available product of the polyester include "NOVADURAN 5010R3-2" (polybutylene terephthalate) manufactured by Mitsubishi Engineering-Plastics Corporation and "DURANEX 2000" (polybutylene terephthalate) manufactured by Polyplastics Co., Ltd.

Next, a resin having a linking group containing a sulfur atom (specific resin C) will be described as the second resin.

The specific resin C may be any resin having a linking group containing a sulfur atom in the molecule thereof. A resin having a linking group containing a sulfur atom refers to a resin having a linking group containing a sulfur atom in the main chain thereof. Specific examples of the specific resin C include thermoplastic resins in which a sulfur atom serves as a linking group and in which monomers are linked with each other with the sulfur atom therebetween and thermoplastic resins having a sulfonyl bond in the main chain thereof. Specific examples include polyphenylene sulfide, polysulfone, polyethersulfone, and polyphenylsulfone. The specific resin C is obtained by a known production method. The specific resin C may be a commercially available resin or a synthesized resin. The specific resin C may contain one or two or more of such resins.

A linking group containing a sulfur atom is contained in the main chain, and an affinity is exhibited between the linking group and a polar group on the surface of the reinforcing fibers (e.g., carbon fibers). Accordingly, it is considered that at least a portion of the specific resin C forms a coating layer on the periphery of the reinforcing fibers.

Examples of a commercially available product of the specific resin C include "FZ-2100" (polyphenylene sulfide) manufactured by DIC Corporation and "SUMIKAEXCEL, 3600G" (polyethersulfone) manufactured by Sumitomo Chemical Company, Limited.

The glass transition temperature or melting point of the specific resin B is not particularly limited as long as the absolute value of the difference in melting temperature between the first resin and the specific resin B is within the above-described range. The glass transition temperature or melting point of the specific resin C is not particularly limited as long as the absolute value of the difference in melting temperature between the first resin and the specific resin C is within the above-described range. For example, the glass transition temperature or melting point of the specific resins B and C is preferably 100° C. or higher and 400° C. or lower, more preferably 150° C. or higher and 350° C. or lower, still more preferably 150° C. or higher and 250° C. or lower, and most preferably 160° C. or higher and 240° C. or lower.

Compatibilizer

The compatibilizer is a resin that enhances the affinity between the first resin and the second resin.

The compatibilizer may be determined according to the first resin and the second resin.

Preferably, the compatibilizer has the same structure as the first resin and contains, in the molecule thereof, a portion having an affinity for the second resin.

For example, when the first resin formed of a polyolefin and a second resin are used, the compatibilizer may be a modified polyolefin.

Here, when the first resin is polypropylene (PP), the modified polyolefin is preferably a modified polypropylene (PP). In the same manner, when the first resin is an ethylene-vinyl acetate copolymer resin (EVA), the modified polyolefin is preferably a modified ethylene-vinyl acetate copolymer resin (EVA).

Examples of the modified polyolefin include polyolefins into which a modified portion having a group or a residue, such as a carboxy group, a carboxylic anhydride residue, a carboxylate residue, an imino group, an amino group, or an epoxy group, is introduced.

From the viewpoint of further improving the affinity between the polyolefin and the specific resin A, and considering the upper limit of the temperature during a molding process, the modified portion introduced into the polyolefin preferably has a carboxylic anhydride residue and particularly preferably a maleic anhydride residue.

The modified polyolefin may be produced by a method including reacting a compound containing the above-described modified portion with a polyolefin to chemically bind the compound to the polyolefin directly or a method including forming a graft chain by using a compound containing the above-described modified portion and binding the graft chain to the polyolefin.

Examples of the compound containing the above-described modified portion include maleic anhydride, fumaric anhydride, succinic anhydride, N-phenylmaleimide, N-cyclohexylmaleimide, glycidyl (meth)acrylate, glycidyl vinylbenzoate, N-[4-(2,3-epoxypropoxy)-3,5-dimethylbenzyl] acrylamide, and alkyl(meth)acrylate, and derivatives thereof.

Among such compounds, a modified polyolefin produced by the reaction between maleic anhydride, which is derived from an unsaturated carboxylic acid, and a polyolefin is preferable.

Specific examples of the modified polyolefin include acid-modified polyolefins, such as maleic anhydride-modified polypropylene, maleic anhydride-modified polyethylene, and a maleic anhydride-modified ethylene-vinyl acetate copolymer resin (EVA), and adducts or copolymers thereof.

A commercially available modified polyolefin may be used as the modified polyolefin.

Examples of the modified polypropylene include UMEX (trade name) series (100TS, 110TS, 1001, and 1010) manufactured by Sanyo Chemical Industries, Ltd.

Examples of the modified polyethylene include UMEX (trade name) series (2000) manufactured by Sanyo Chemical Industries, Ltd. and MODIC (trade name) series manufactured by Mitsubishi Chemical Corporation.

Examples of the modified ethylene-vinyl acetate copolymer resin (EVA) include MODIC (trade name) series manufactured by Mitsubishi Chemical Corporation.

Examples of the compatibilizer used when the specific resin B and the specific resin C are used include "FG polymers" (maleic anhydride-denatured styrene-ethylene/butylene-styrene copolymers) manufactured by Kraton Corporation and "MODIPER A4300" (glycidyl-denatured methyl methacrylate) manufactured by NOF CORPORATION.

The molecular weight of the compatibilizer is not particularly limited; however, from the viewpoint of workability, the molecular weight is preferably 5,000 or more and 100,000 or less and more preferably 5,000 or more and 80,000 or less.

Other Constituents

The resin molded article according to the present exemplary embodiment may contain other constituents in addition to the above-described constituents.

Examples of the other constituents include known additives, such as flame retardants, flame retardant aids, agents for preventing dripping that occurs when heat is applied, plasticizing agents, antioxidants, release agents, light-resistant agents, weather-resistant agents, colorants, pigments, modifying agents, antistatic agents, anti-hydrolysis agents, fillers, and reinforcing agents other than reinforcing fibers (e.g., talc, clay, mica, glass flake, milled glass, glass beads, crystalline silica, alumina, silicon nitride, aluminum nitride, and boron nitride).

For example, the amount of other constituents is preferably 0 parts by mass or more and 10 parts by mass or less and more preferably 0 parts by mass or more and 5 parts by mass or less relative to 100 parts by mass of the first resin. Here, "0 parts by mass" indicates that other constituents are not contained.

Composition of Constituents Contained in Resin Molded Article

In the resin molded article according to the present exemplary embodiment, from the viewpoint of improving cycle fatigue properties, the amount of second resin is preferably 5 parts by mass or more and 150 parts by mass or less, more preferably 5 parts by mass or more and 140 parts by mass or less, and still more preferably 10 parts by mass or more and 125 parts by mass or less relative to 100 parts by mass of the first resin.

When the amount of second resin contained is within the above-described range relative to 100 parts by mass of the first resin, the amount of compatibilizer relatively decreases with respect to the amount of second resin, and thus, the second resin is unlikely to spread in the first resin and is likely to be localized on the periphery of the reinforcing fibers (e.g., carbon fibers). Accordingly, it is considered that a coating layer formed of the second resin is formed so as to be thickened to some extent and so as to be substantially uniform on the entire periphery of the reinforcing fibers. Therefore, it is considered that adhesion at the interface between the reinforcing fibers and the first resin is enhanced and that a resin molded article having excellent mechanical strength (particularly, flexural modulus) and improved cycle fatigue properties is likely to be obtained.

In the resin molded article according to the exemplary embodiment, from the viewpoint of improving cycle fatigue properties, the amount of compatibilizer is preferably 1 part by mass or more and 10 parts by mass or less, more preferably 1 part by mass or more and 9 parts by mass or less, and still more preferably 3 parts by mass or more and 9 parts by mass or less relative to 100 parts by mass of the first resin. The amount of second resin is within the above-described range, so that the affinity between the first resin and the second resin may be enhanced and cycle fatigue properties may be improved. Mechanical strength (particularly, flexural modulus) may also be improved.

From the viewpoint of improving cycle fatigue properties, the amount of second resin is preferably 5 parts by mass or more and 150 parts by mass or less relative to 100 parts by mass of the first resin. From the viewpoint of improving cycle fatigue properties, the amount of compatibilizer is preferably 1 part by mass or more and 10 parts by mass or less relative to 100 parts by mass of the first resin. The amount of second resin and the amount of compatibilizer are within the above-described range relative to 100 parts by mass of the first resin, so that the first domains and the second domains are likely to be formed, and furthermore, the second domain A and the second domain B are likely to be formed. In addition, the gel fraction is likely to be 10% or more and 60% or less. Furthermore, the distribution of distances between the reinforcing fibers is likely to have at least two local maximum values.

In the resin molded article according to the present exemplary embodiment, from the viewpoint of improving cycle fatigue properties, the amount of reinforcing fibers is preferably 5 parts by mass or more and 150 parts by mass or less, more preferably 5 parts by mass or more and 100 parts by mass or less, and still more preferably 5 parts by mass or more and 80 parts by mass or less relative to 100 parts by mass of the first resin.

The amount of reinforcing fibers is 5 parts by mass or more relative to 100 parts by mass of the first resin, so that the resin molded article may be reinforced. On the other hand, the amount of reinforcing fibers is 150 parts by mass or less relative to 100 parts by mass of the first resin, so that the moldability during production of the resin molded article may be improved.

When two or more types of reinforcing fibers are used, the amount of reinforcing fibers refers to the total amount of all reinforcing fibers. When carbon fibers are used as the reinforcing fibers, the amount of carbon fibers is preferably 10 mass % or more relative to the total mass of reinforcing fibers.

In the resin molded article according to the present exemplary embodiment, from the viewpoint of improving cycle fatigue properties, the amount of second resin is preferably 5 mass % or more and 100 mass % or less, more preferably 5 mass % or more and 80 mass % or less, still more preferably 5 mass % or more and 50 mass % or less relative to the mass of the reinforcing fibers.

The amount of second resin is within the above-described range relative to the mass of the reinforcing fibers, so that the affinity between the reinforcing fibers and the second resin is likely to be enhanced and flowability of the resin composition during production of the resin molded article is likely to be improved.

In the resin molded article according to the exemplary embodiment, from the viewpoint of improving cycle fatigue properties, the amount of compatibilizer is preferably 0.1 mass % or more and 30 mass % or less, more preferably 1 mass % or more and 30 mass % or less, and still more preferably 1 mass % or more and 15 mass % or less relative to the mass of the reinforcing fibers.

The amount of compatibilizer is within the above-described range relative to the mass of the reinforcing fibers, so that the affinity between the reinforcing fibers and the second resin is likely to be exhibited and remaining of an unreacted functional group that causes discoloration or degradation may be suppressed.

Furthermore, the amount of compatibilizer is preferably 0.1 parts by mass or more and 50 parts by mass or less, more preferably 0.1 parts by mass or more and 40 parts by mass or less, and still more preferably 1 part by mass or more and 40 parts by mass or less relative to 100 parts by mass of the second resin. When the amount of compatibilizer is within the above-described range relative to 100 parts by mass of the second resin, the thickness of the coating layer formed on the surface of the reinforcing fibers is within the appropriate range, and thus, cycle fatigue properties are likely to be improved.

Here, the amount of compatibilizer is within the above-described range relative to 100 parts by mass of the second resin, so that the first domains that do not contain the reinforcing fibers and the second domains that contain the reinforcing fibers (second domain A containing one fiber and second domain B containing two or more fibers) are more likely to be formed, and such domains are more likely to form a pseudo-cross-linked structure.

The first domains and the second domains (second domain A and second domain B) are considered to be formed as follows. First, the second resin forms a coating layer on at least a portion of the periphery of the reinforcing fibers to form the second domains. Then, the reinforcing fibers having a coating layer are ranged with the second resin disposed therebetween to reduce the interfacial area, and the second domain B is formed. Next, the residual second resin, which does not form a coating layer, forms the first domains.

In the resin molded article according to the present exemplary embodiment, from the viewpoint that cycle fatigue properties are likely to be improved, the total amount of second resin and compatibilizer is preferably 10 parts by mass or more and 50 parts by mass or less and more preferably 15 parts by mass or more and 50 parts by mass or less relative to 100 parts by mass of the total amount of first resin, second resin, and compatibilizer.

Properties of Resin Molded Article
Domain Diameter

In the resin molded article according to the present exemplary embodiment, from the viewpoint of improving cycle fatigue properties, the first domains that do not contain the reinforcing fibers preferably have a domain diameter of 0.1 μm or more and 20 μm or less, more preferably 0.1 μm or more and 15 μm or less, and still more preferably 1 μm or more and 15 μm or less. When the first domains have a domain diameter of 20 μm or less, the second resin is likely to be attached to the reinforcing fibers. Thus, the first domains and the second domains are likely to be formed, and a pseudo-cross-linked structure is likely to be formed. When the first domains have a domain diameter of 0.1 μm or more, degradation of the interface strength between the first resin and the second resin is likely to be suppressed. Therefore, when the first domains have a domain diameter within the above-described range, cycle fatigue properties are likely to be improved.

In the resin molded article according to the first exemplary embodiment, from the viewpoint of improving cycle fatigue properties, the second domain A containing one of the reinforcing fibers preferably has a domain diameter of 10 μm or more and 80 μm or less, more preferably 15 μm or more and 80 μm or less, and still more preferably 15 μm or more and 75 μm or less.

Furthermore, from the same viewpoint, the second domain B containing two or more of the reinforcing fibers preferably has a domain diameter of 80 μm or more and 2,000 μm or less, more preferably 80 μm or more and 1,800 μm or less, and still more preferably 100 μm or more and 1,800 μm or less.

In the second exemplary embodiment and the third exemplary embodiment, from the viewpoint of improving cycle fatigue properties, the second domains that contain the reinforcing fibers preferably include the second domain A containing one of the reinforcing fibers and the second domain B containing two or more of the reinforcing fibers. When the second domains in the second exemplary embodiment and the third exemplary embodiment include the second domain A and the second domain B, the domain diameter of the second domain A and the domain diameter of the second domain B are preferably in the same range as those in the first exemplary embodiment.

The domain diameter of the first domain, the second domain A, and the second domain B is measured as follows.

A cross section perpendicular to the resin flow direction of the resin molded article (e.g., injection direction of an injection molded article) is observed. Specifically, a specimen of the measurement object is embedded in an epoxy resin, and a precisely polished cross section is produced by using an automatic polisher (Vector manufactured by Buehler Ltd.).

Next, an image of the polished cross section of the specimen is taken at random at a magnification of 1500× in three visual fields by using a SEM (S-3400N manufactured by Hitachi, Ltd., accelerating voltage 15 KV). The luminance range is set so as to extract all moieties formed of the second resin such as coating-layer moieties covering the reinforcing fibers and isolated moieties (domains that do not contain the reinforcing fibers, formed of the second resin, i.e., domains corresponding to the first domains) by using image analysis software (Image-Pro Plus).

Then, the coating-layer moieties are manually excluded, and the isolated moieties (corresponding to domains formed of polyamide) are used for the measurement. The diameter and the number of objects are selected as measurement items and measured to determine the size (diameter) of each domain (diameter refers to equivalent-circle diameter) and the number of the domains. Then, the average size (diameter) of the domains is determined.

Area Percentage of Domains

In the resin molded article according to the present exemplary embodiment, from the viewpoint of improving cycle fatigue properties, the area percentage of the first domains is preferably 0.1% or more and 50% or less, more preferably 1% or more and 30% or less, and still more preferably 1% or more and 10% or less relative to the area of the total domains (total of the first domains and the second domains) formed in the first resin. The area percentage of the first domains is within the above-described range, so that an effect of the first domains serving as the aggregate is likely to be more effectively exhibited. In addition, the flexural modulus is likely to be improved. The area percentage of the second domains is the remainder of the area percentage of the total domains.

Furthermore, when the first domains have a domain diameter within the above-described range and the area percentage of the first domains is within the above-described range, the first domains and the second domains are likely to be formed and a pseudo-cross-linked structure is likely to be formed. Accordingly, cycle fatigue properties are likely to be improved. In addition, the flexural modulus is likely to be further improved.

In the first exemplary embodiment, from the viewpoint of improving cycle fatigue properties, the area percentage of the second domain A is preferably 5% or more and 50% or less, more preferably 5% or more and 40% or less, and still more preferably 5% or more and 30% or less relative to the area of the total domains formed in the first resin.

In the first exemplary embodiment, from the same viewpoint, the area percentage of the second domain B is preferably 5% or more and 50% or less, more preferably 5% or more and 40% or less, and still more preferably 5% or more and 30% or less relative to the area of the total domains formed in the first resin.

In the second exemplary embodiment and the third exemplary embodiment, from the same viewpoint, when the second domains include the second domain A and the second domain B, the area percentage of the second domain A and the area percentage of the second domain B are the same as those in the first exemplary embodiment.

In the present exemplary embodiment, from the viewpoint of improving cycle fatigue properties, the ratio of the total area of the first domains to the area of the base material serving as the matrix (domain area/matrix area) is preferably 10/100 or more and 80/100 or less, more preferably 15/100 or more and 60/100 or less. The ratio of the total area of the second domains to the area of the base material serving as the matrix (domain area/matrix area) is preferably 10/100 or more and 80/100 or less and more preferably 15/100 or more and 60/100 or less.

In the resin molded article according to the exemplary embodiment, the area percentage of the reinforcing fibers is preferably 5% or more and 80% or less and more preferably 5% or more and 70% or less in the area of the total second domains (total of the second domain A and the second domain B). When the area percentage of the total domains is within the above-described range, cycle fatigue properties are likely to be improved.

The area of the first domains, the area of the second domains (second domain A and second domain B), and the area of the base material serving as the matrix are measured as follows. To determine the area percentage of such domains and to determine domain area/matrix area, a cross section perpendicular to the resin flow direction of the resin molded article (e.g., injection direction of an injection molded article) is observed. The area percentage of the reinforcing fibers in the total second domains (total of the second domain A and the second domain B) is also determined in the same manner.

Specifically, a specimen of the measurement object is embedded in an epoxy resin, and a precisely polished cross section is produced by using an automatic polisher (Vector manufactured by Buehler Ltd.).

Next, an image of the polished cross section of the specimen is taken at random at a magnification of 1500× in three visual fields by using a SEM (S-3400N manufactured by Hitachi, Ltd., accelerating voltage 15 KV). Each area of the first domains and the second domains (second domain A and second domain B) is determined by using image analysis software (Image-Pro Plus) to determine the total area of all the domains. Then, the area percentage of the first domains and the area percentage of the second domains are calculated from the total area.

In the same manner, an image of the polished cross section of the specimen is taken at random at a magnification of 1500× in three visual fields and observed, and the total area of the observed cross sections is calculated. Then, the area percentage of all the domains relative to the total area of the observed cross sections is calculated.

In the same manner, an image of the polished cross section of the specimen is taken at random at a magnification of 1500× in three visual fields and observed. Then, the area percentage of the reinforcing fibers relative to the total area of the observed second domains is calculated.

Gel Fraction

The gel fraction of the resin molded article according to second exemplary embodiment is preferably 10% or more and 60% or less, more preferably 10% or more and 50% or less, and still more preferably 10% or more and 40% or less. Also, in the first exemplary embodiment and the third exemplary embodiment, from the same viewpoint, the gel fraction is preferably within the above range. When the gel fraction of the resin molded article is within the above range, the first domains and the second domains (second domain A and second domain B) are considered to form a pseudo-cross-linked structure, and thus, cycle fatigue properties may be improved.

The measurement of the gel fraction is performed in conformity with JIS K6796 (1994).

Specifically, a measurement sample is taken from a resin molded article serving as a measurement object. The mass of the taken measurement sample is measured and regarded as the mass before solvent extraction. Next, the measurement sample is impregnated in a toluene solvent at 80° C. for 24 hours. Thereafter, the solvent is filtered, and the residue is vacuum-dried and weighed. The weight is regarded as the mass after solvent extraction. Then, the gel fraction is calculated in accordance with the following formula:

gel fraction=100×(mass after solvent extraction−(mass of second resin+mass of reinforcing fibers))/(mass before solvent extraction)

Distribution of Distances Between Fibers

In the third exemplary embodiment, the distribution of distances between the reinforcing fibers in the resin molded article has at least two local maximum values. Also, in the first exemplary embodiment and the second exemplary embodiment, from the same viewpoint, the distribution of distances between the fibers preferably has at least two local maximum values. When the distribution of distances between the reinforcing fibers has two or more local maximum values, the first domains and the second domains (second domain A and second domain B) are considered to form a pseudo-cross-linked structure, and thus, cycle fatigue properties may be improved.

In the present specification, the local maximum value of the distribution of distances between the reinforcing fibers refers to a local maximum value of the frequency distribution curve of the distances between the adjacent reinforcing fibers (distribution curve of the distances between the reinforcing fibers). The distances are measured during observation of a cross section of the resin molded article.

When the distribution curve of the distances between the reinforcing fibers is drawn, the distances being measured by the following measurement method, the term "local maximum value" (i.e., peak) refers to the frequency value of a point at which the gradient of the curve changes from positive to negative in a convex portion of the distribution curve, which repeatedly fluctuates up and down. The difference between the frequency value of the point, at which the gradient of the distribution curve changes from positive to negative, and the frequency value of the neighboring local minimum point (local minimum value), at which the gradient of the distribution curve changes from negative to positive and which has the highest frequency value of the two neighboring local minimum points, is 3% or more.

Portions of the distribution curve of the distances between the reinforcing fibers that do not repeatedly fluctuate up and down (a gentle positive-gradient portion, a gentle negative-gradient portion, and a flat portion) are regarded to have no local maximum values. In the case where the distribution curve repeatedly fluctuates up and down to make convex portions, if the difference between the frequency value of a point at which the gradient of the curve changes from positive to negative and the neighboring local minimum value, which is the highest of the two neighboring local minimum values, is less than 3%, the frequency value of the point is not regarded as a local maximum value.

The distribution of distances between the reinforcing fibers is determined by observing a cross section perpendicular to the resin flow direction of the resin molded article (e.g., injection direction of an injection molded article) and measuring the distances. Specifically, the measurement is performed as follows. A specimen is cut out and embedded in an epoxy resin. The surface is polished, and deposition is performed. Thereafter, a SEM image is taken to compare occupied areas with each other by using image analysis software.

As described above, the cross section observed in the resin molded article according to the present exemplary embodiment is a cross section perpendicular to the resin flow direction. For example, in the case where the resin molded article is an injection molded article, the cross section may be a cross section of the injection molded article, from which the runner has been cut and removed, that is perpendicular to the resin flow direction (injection direction) and that is in the periphery of a portion where the runner had been present (i.e., in the periphery of a portion of the injection molded article that had been connected to the runner before the runner portion has been cut and removed from the injection molded article).

Method for Producing Resin Molded Article

The resin molded article according to the present exemplary embodiment may be obtained by preparing a resin composition containing four constituents such as a first resin, reinforcing fibers, a second resin, and a compatibilizer and molding the resin composition. The resin molded article according to the present exemplary embodiment may also be obtained by preparing a composition containing the constituents other than reinforcing fibers and mixing the resin composition with reinforcing fibers when molding is performed.

The resin composition may be prepared by melt-kneading the above constituents.

Examples of apparatuses for melt-kneading include known apparatuses, such as a twin-screw extruder, a Henschel mixer, a Banbury mixer, a single-screw extruder, a multiple-screw extruder, and a co-kneader.

The temperature during melt-kneading (cylinder temperature) may be determined according to the melting temperature of a resin constituent contained in the resin composition.

In particular, the resin composition is preferably obtained by a production method including melt-kneading a first resin, reinforcing fibers, a second resin, and a compatibilizer. When a first resin, reinforcing fibers, a second resin, and a compatibilizer are simultaneously melt-kneaded, a coating layer formed of the second resin is likely to be formed thin and substantially uniform on the periphery of the reinforcing fibers, and thus, the mechanical strength, particularly, the flexural modulus may be enhanced.

The melt mass-flow rate (MFR) of the resin composition is preferably 0.1 g/10 min or more and 1,000 g/10 min or less and more preferably 1 g/10 min or more and 1,000 g/10 min or less. When the MFR of the resin composition is within the above range, flowability of the resin composition may be improved, and thus, moldability may be improved. The MFR of the resin composition is measured in conformity with JIS K7210-1 (2014) under conditions of a temperature 20° C. higher than the melting temperature of the second resin and a load of 5 kg. In other words, the MFR is a value representing the flowability of the molten resin and is determined by measuring the amount of resin that is melted in a cylinder and that is extruded for 10 minutes under the above-described conditions (temperature and load) through a die that is disposed at the bottom of the cylinder and that has a predetermined aperture diameter. The MFR of the resin composition is within the above-described range, so that a resin molded article having an improved cycle fatigue properties is likely to be obtained.

Examples of the method for molding the resin molded article according to the present exemplary embodiment include injection molding, extrusion molding, blow molding, heat press molding, calendering, coating molding, casting molding, dipping molding, vacuum molding, and transfer molding.

From the viewpoint of selecting the shape with less limitations, the method for molding the resin molded article according to the present exemplary embodiment is preferably injection molding. The cylinder temperature for injection molding is, for example, 180° C. or higher and 300° C. or lower and preferably 200° C. or higher and 280° C. or lower. The mold temperature for injection molding is, for example, 30° C. or higher and 100° C. or lower and preferably 30° C. or higher and 60° C. or lower.

Injection molding may be performed by using a commercially available apparatus, such as NEX150 manufactured by NISSEI PLASTIC INDUSTRIAL CO., LTD., NEX300 manufactured by NISSEI PLASTIC INDUSTRIAL CO., LTD., and SE50D manufactured by Sumitomo Heavy Industries, Ltd.

A preferable exemplary method for obtaining the resin molded articles according to the present exemplary embodiments (i.e., the first exemplary embodiment, the second exemplary embodiment, and the third exemplary embodiment) may be as follows.

To reduce the energy load during kneading, the compression zone is minimized as much as possible, and the back-pressure is set at 0 (kg/cm$^2$). The compression zone of a screw has a reverse-tapered shape to apply pressure to promote plasticization. Due to the pressure, fibers are broken to be shorter. Thus, here, the screw is used mainly for transfer to keep the fiber length. Accordingly, a less reverse-tapered screw is used as the screw. The screw is pushed back by plastics transferred by rotation of the screw to the front. Pressure applied to the screw to keep the screw from being easily pushed back is referred to as back-pressure. The fibers are broken due to the back-pressure, and thus, the back-pressure is not applied. In the above operation, the second domains (second domain A and second domain B) are formed.

Applications of Resin Molded Article

The resin molded articles according to the present exemplary embodiments may be suitably used for applications, such as electronic/electrical devices, office equipment, home appliances, car interior materials, and containers. more specific examples include housings for electronic/electrical devices and home appliances, various components of electronic/electric devices and home appliances, car interior components, storage cases for CD-ROMs and DVDs, tableware, drink bottles, food trays, wrapping materials, films, and sheets.

In particular, the resin molded articles according to the present exemplary embodiments include reinforcing fibers and may thus have improved mechanical strength (particularly, flexural modulus). Accordingly, the resin molded articles according to the present exemplary embodiments may be suitably used as substitutes for metal components.

Examples

Hereinafter, the exemplary embodiments of the disclosure will be specifically described with reference to Examples; however, the exemplary embodiments of the disclosure are not limited to Examples.

Examples 1 to 21 and Comparative Examples 1 to 16

Constituents in Tables 1 to 5 (values in tables are expressed in parts) are kneaded by using a twin-screw kneader (TEM58SS manufactured by TOSHIBA MACHINE CO., LTD.) under the following kneading conditions at a melt-kneading temperature (cylinder temperature) in Tables 1 to 5 to obtain pellets that are resin compositions. The obtained pellets are fired at 600° C. for 2 hours. The average fiber length of remaining reinforcing fibers (e.g., carbon fibers) is measured by the above-described method. The measurement results are summarized in Tables 1 to 5. The MFR of the resin compositions used in Examples, that is measured by the already described method, is 0.1 g/10 min or more and 200 g/10 min or less.

Kneading Conditions screw diameter: φ58 mm number of rotation: 300 rpm discharge nozzle diameter: 1 mm The obtained pellets are subjected to injection molding by using an injection molding apparatus (NEX150 manufactured by NISSEI PLASTIC INDUSTRIAL CO., LTD.) at an injection molding temperature (cylinder temperature) in Tables 1 to 5 and at a mold temperature of 50° C. with the back-pressure set at 0 (kg/cm$^2$) (this setting is not performed in Comparative Examples) to mold ISO multipurpose dumbbell-shaped specimens (corresponding to the ISO 527 tensile testing and the ISO 178 flexure testing)(test area: thickness 4 mm, width 10 mm) and D2 specimens (length 60 mm, width 60 mm, thickness 2 mm).

Flexural Modulus

The flexural modulus of the obtained ISO multipurpose dumbbell-shaped specimens is measured in conformity with ISO 178 by using a multipurpose precision universal tester (AG-Xplus manufactured by Shimadzu Corporation).

Heat Deflection Temperature (HDT)

The heat deflection temperature (° C.) of the obtained ISO multipurpose dumbbell-shaped specimens is measured under a load of 1.8 MPa in conformity with ISO 178 flexure testing by using an HDT tester (HDT-3 manufactured by Toyo Seiki Seisaku-sho, Ltd.).

Cyclic Fatigue Properties (Fatigue Resistance)

The fatigue resistance of the obtained JIS K 7119 dumbbell-shaped specimens is measured in conformity with cantilever-type flexural fatigue testing JIS K7118 by using B-70 manufactured by Toyo Seiki Seisaku-sho, Ltd. at 23° C. and 65% RH and at 300 rpm for $10^7$ cycles and expressed as stress retention (fatigue properties retention) after a predetermined cycle number or at fracture, relative to the initial value.

Presence/Absence of Coating Layer

Whether a coating layer formed of the second resin is present in the obtained D2 specimens is observed by the already described method.

TABLE 1

| | | | Example | | | | | | |
|---|---|---|---|---|---|---|---|---|---|
| | | | Example 1 | Example 2 | Example 3 | Example 4 | Example 5 | Example 6 | Example 7 |
| Composition | First resin (a) | Polypropylene (melting point 165° C.) | 100 | 100 | 100 | 100 | 100 | 100 | 100 |
| | | Polyethylene (melting point 120° C.) | | | | | | | |
| | Reinforcing fiber | Carbon fiber | 50 | 50 | 50 | 50 | 50 | 50 | 50 |
| | | Glass fiber | | | | | | | |
| | Second resin (b) | PA6 (melting point 225° C.) | 10 | 50 | 40 | 40 | 10 | 15 | 20 |
| | | PA12 (melting point 175° C.) | | | | | | | |
| | | MXD6 (melting point 237° C.) | | | | | | | |
| | | PBT (melting point 232° C.) | | | | | | | |
| | | PPS (melting point 278° C.) | | | | | | | |
| | | PES (melting point 288° C.) | | | | | | | |
| | Difference in melting temperature between first resin and second resin (° C.) | | 60 | 60 | 60 | 60 | 60 | 60 | 60 |
| | Compatibilizer (c) | Maleic anhydride-modified polypropylene | 1.5 | 10 | 1.0 | 10 | 3.0 | 5.0 | 6.0 |
| | | Maleic anhydride-modified polyethylene | | | | | | | |
| | | Maleic anhydride-denatured SEBS | | | | | | | |
| | Total | | 161.5 | 210.0 | 191.0 | 200.0 | 163.0 | 170.0 | 176.0 |
| Conditions | Melt-kneading temperature (° C.) | | 230 | 230 | 230 | 230 | 230 | 230 | 230 |
| | Injection molding temperature (° C.) | | 240 | 240 | 240 | 240 | 240 | 240 | 240 |
| Properties | Flexural modulus (GPa) | | 25.4 | 23.8 | 32.7 | 30.5 | 31 | 30.8 | 30.8 |
| | Heat deflection temperature (HDT; ° C.) | | 212 | 203 | 245 | 238 | 235 | 231 | 230 |
| | Fatigue properties retention (%) | | 65 | 67 | 76 | 75 | 77 | 75 | 74 |
| Properties | First domain | Area percentage (relative to total domains) | 2 | 2 | 2 | 8 | 3 | 4 | 4 |
| | | Domain diameter (μm) | 0.5 | 0.1 | 20 | 0.1 | 0.4 | 0.6 | 0.4 |
| | Second domain A | Area percentage (relative to total domains) | 16 | 15 | 5 | 22 | 17 | 13 | 21 |
| | | Domain diameter (μm) | 10 | 10 | 80 | 41 | 38 | 21 | 16 |
| | Second domain B | Area percentage (relative to total domains) | 16 | 17 | 50 | 26 | 16 | 16 | 14 |
| | | Domain diameter (μm) | 80 | 82 | 2000 | 1002 | 1564 | 852 | 356 |
| | Gel fraction (%) | | 12 | 12.3 | 15.5 | 15.9 | 13.1 | 13.2 | 13.6 |
| | Number of peaks in distribution of distances between fibers | | 2 | 2 | 2 | 2 | 2 | 2 | 2 |
| | Presence of coating layer | | present | present | present | present | present | present | present |
| | Average fiber length (mm) | | 0.5 | 0.7 | 0.6 | 0.5 | 0.7 | 0.6 | 0.5 |
| Remarks | Reinforcing fibers (parts) (relative to 100 parts of first resin) | | 50 | 50 | 50 | 50 | 50 | 50 | 50 |
| | Second resin (parts) (relative to 100 parts of first resin) | | 10 | 50 | 40 | 40 | 10 | 15 | 20 |
| | Compatibilizer (parts) (relative to 100 parts of first resin) | | 1.5 | 10 | 1.0 | 10 | 3.0 | 5.0 | 6.0 |
| | Second resin (mass %) (relative to 100 mass % of reinforcing fibers) | | 20 | 100 | 80 | 80 | 20 | 30 | 40 |
| | Compatibilizer (mass %) (relative to 100 mass % of reinforcing fibers) | | 3.0 | 20 | 2.0 | 20 | 6.0 | 10 | 12 |
| | Compatibilizer (parts) (relative to 100 parts of second resin) | | 15 | 20 | 2.5 | 25 | 30 | 33 | 30 |
| | Reinforcing fiber content in resin molded article (%) | | 31 | 24 | 26 | 25 | 31 | 29 | 28 |
| | (a) + (b) (parts) (relative to 100 parts of (a) + (b) + (c)) | | 10 | 38 | 29 | 33 | 12 | 17 | 21 |

TABLE 2

| | | | Example | | | | | | |
|---|---|---|---|---|---|---|---|---|---|
| | | | Example 8 | Example 9 | Example 10 | Example 11 | Example 12 | Example 13 | Example 14 |
| Composition | First resin (a) | Polypropylene (melting point 165° C.) | 100 | 100 | 100 | 100 | 100 | | 75 |
| | | Polyethylene (melting point 120° C.) | | | | | | 100 | 25 |
| | Reinforcing fiber | Carbon fiber | 50 | 50 | 100 | 25 | 200 | 50 | 50 |
| | | Glass fiber | | | | | | | |
| | Second resin (b) | PA6 (melting point 225° C.) | 25 | 35 | 15 | 15 | 15 | | |
| | | PA12 (melting point 175° C.) | | | | | | 15 | 30 |
| | | MXD6 (melting point 237° C.) | | | | | | | |

TABLE 2-continued

|  |  | Example 8 | Example 9 | Example 10 | Example 11 | Example 12 | Example 13 | Example 14 |
|---|---|---|---|---|---|---|---|---|
|  | PBT (melting point 232° C.) |  |  |  |  |  |  |  |
|  | PPS (melting point 278° C.) |  |  |  |  |  |  |  |
|  | PES (melting point 288° C.) |  |  |  |  |  |  |  |
|  | Difference in melting temperature between first resin and second resin (° C.) | 60 | 60 | 60 | 60 | 60 | 10 | 10 |
| Compatibilizer (c) | Maleic anhydride-modified polypropylene | 7.0 | 9.0 | 5.0 | 5.0 | 5.0 |  | 9.0 |
|  | Maleic anhydride-modified polyethylene |  |  |  |  |  | 5.0 | 1.0 |
|  | Maleic anhydride-denatured SEBS |  |  |  |  |  |  |  |
|  | Total | 182.0 | 194.0 | 220.0 | 145.0 | 320.0 | 170.0 | 190.0 |
| Conditions | Melt-kneading temperature (° C.) | 230 | 230 | 230 | 230 | 230 | 230 | 230 |
|  | Injection molding temperature (° C.) | 240 | 240 | 240 | 240 | 240 | 240 | 240 |
| Properties | Flexural modulus (GPa) | 31.3 | 32.5 | 38.5 | 18.4 | 44.9 | 19.4 | 25.8 |
|  | Heat deflection temperature (HDT; ° C.) | 234 | 241 | 289 | 201 | 287 | 168 | 194 |
|  | Fatigue properties retention (%) | 74 | 75 | 68 | 70 | 60 | 78 | 77 |
| Properties | First domain | Area percentage (relative to total domains) | 3 | 6 | 2 | 3 | 2 | 2 | 5 |
|  |  | Domain diameter (μm) | 0.3 | 0.1 | 0.6 | 0.5 | 0.6 | 0.1 | 0.2 |
| Second domain A | Area percentage (relative to total domains) | 7 | 5 | 21 | 7 | 5 | 8 | 11 |
|  | Domain diameter (μm) | 15 | 11 | 16 | 16 | 18 | 11 | 10 |
| Second domain B | Area percentage (relative to total domains) | 25 | 28 | 26 | 19 | 50 | 18 | 21 |
|  | Domain diameter (μm) | 415 | 124 | 1854 | 152 | 1934 | 474 | 521 |
|  | Gel fraction (%) | 15.1 | 16.8 | 12.2 | 12.3 | 11.5 | 11.6 | 12.5 |
|  | Number of peaks in distribution of distances between fibers | 2 | 2 | 2 | 2 | 2 | 2 | 2 |
|  | Presence of coating layer | present | present | present | present | present | present | present |
|  | Average fiber length (mm) | 0.7 | 0.6 | 0.7 | 0.4 | 0.5 | 0.7 | 0.7 |
| Remarks | Reinforcing fibers (parts) (relative to 100 parts of first resin) | 50 | 50 | 100 | 25 | 200 | 50 | 50 |
|  | Second resin (parts) (relative to 100 parts of first resin) | 25 | 35 | 15 | 15 | 15 | 15 | 30 |
|  | Compatibilizer (parts) (relative to 100 parts of first resin) | 7.0 | 9.0 | 5.0 | 5.0 | 5.0 | 5.0 | 10 |
|  | Second resin (mass %) (relative to 100 mass % of reinforcing fibers) | 50 | 70 | 15 | 60 | 7.5 | 30 | 60 |
|  | Compatibilizer (mass %) (relative to 100 mass % of reinforcing fibers) | 14 | 18 | 5.0 | 20 | 2.5 | 10 | 20 |
|  | Compatibilizer (parts) (relative to 100 parts of second resin) | 28 | 26 | 33 | 33 | 33 | 33 | 33 |
|  | Reinforcing fiber content in resin molded article (%) | 27 | 26 | 45 | 17 | 63 | 29 | 26 |
|  | (a) + (b) (parts) (relative to 100 parts of (a) + (b) + (c)) | 24 | 31 | 17 | 17 | 17 | 17 | 29 |

TABLE 3

|  |  |  | Example 15 | Example 16 | Example 17 | Example 18 | Example 19 | Example 20 | Example 21 |
|---|---|---|---|---|---|---|---|---|---|
| Composition | First resin (a) | Polypropylene (melting point 165° C.) | 100 | 100 | 100 | 100 | 100 | 100 | 100 |
|  |  | Polyethylene (melting point 120° C.) |  |  |  |  |  |  |  |
|  | Reinforcing fiber | Carbon fiber | 50 | 50 |  | 50 | 50 | 50 | 50 |
|  |  | Glass fiber |  |  | 50 |  |  |  |  |
|  | Second resin (b) | PA6 (melting point 225° C.) |  |  | 15 |  |  |  |  |
|  |  | PA12 (melting point 175° C.) | 15 |  |  |  |  |  |  |
|  |  | MXD6 (melting point 237° C.) |  | 15 |  |  |  |  |  |
|  |  | PBT (melting point 232° C.) |  |  |  | 15 | 35 |  |  |
|  |  | PPS (melting point 278° C.) |  |  |  |  |  | 15 |  |
|  |  | PES (melting point 288° C.) |  |  |  |  |  |  | 15 |
|  | Difference in melting temperature between first resin and second resin (° C.) | 10 | 72 | 60 | 67 | 67 | 113 | 123 |

TABLE 3-continued

|  |  |  | Example 15 | Example 16 | Example 17 | Example 18 | Example 19 | Example 20 | Example 21 |
|---|---|---|---|---|---|---|---|---|---|
|  | Compatibilizer (c) | Maleic anhydride-modified polypropylene | 5.0 | 5.0 | 5.0 |  |  |  |  |
|  |  | Maleic anhydride-modified polyethylene |  |  |  |  |  |  |  |
|  |  | Maleic anhydride-denatured SEBS |  |  |  | 5.0 | 9.0 | 5.0 | 5.0 |
|  |  | Total | 170.0 | 170.0 | 170.0 | 170.0 | 194.0 | 170.0 | 170.0 |
| Conditions |  | Melt-kneading temperature (° C.) | 230 | 230 | 230 | 240 | 240 | 280 | 290 |
|  |  | Injection molding temperature (° C.) | 240 | 240 | 240 | 255 | 255 | 290 | 290 |
| Properties |  | Flexural modulus (GPa) | 21.5 | 30.2 | 15.8 | 26.7 | 29.7 | 32.1 | 35.2 |
|  |  | Heat deflection temperature (HDT; ° C.) | 185 | 225 | 164 | 238 | 247 | 257 | 265 |
|  |  | Fatigue properties retention (%) | 74 | 77 | 61 | 71 | 72 | 65 | 64 |
| Properties | First domain | Area percentage (relative to total domains) | 2 | 3 | 3 | 4 | 6 | 2 | 5 |
|  |  | Domain diameter (μm) | 0.6 | 4.7 | 0.7 | 3.5 | 4.7 | 6.2 | 6.8 |
|  | Second domain A | Area percentage (relative to total domains) | 7 | 6 | 19 | 5 | 15 | 19 | 18 |
|  |  | Domain diameter (μm) | 18 | 10 | 18 | 11 | 6 | 21 | 22 |
|  | Second domain B | Area percentage (relative to total domains) | 19 | 18 | 6 | 20 | 27 | 12 | 15 |
|  |  | Domain diameter (μm) | 614 | 549 | 657 | 521 | 314 | 1541 | 1641 |
|  |  | Gel fraction (%) | 11.4 | 11.1 | 11.5 | 12.5 | 12.8 | 12.5 | 13.1 |
|  |  | Number of peaks in distribution of distances between fibers | 2 | 2 | 2 | 2 | 2 | 2 | 2 |
|  |  | Presence of coating layer | present | present | present | present | present | present | present |
|  |  | Average fiber length (mm) | 0.6 | 0.7 | 2.0 | 0.7 | 0.7 | 0.5 | 0.6 |
| Remarks |  | Reinforcing fibers (parts) (relative to 100 parts of first resin) | 50 | 50 | 50 | 50 | 50 | 50 | 50 |
|  |  | Second resin (parts) (relative to 100 parts of first resin) | 15 | 15 | 15 | 15 | 35 | 15 | 15 |
|  |  | Compatibilizer (parts) (relative to 100 parts of first resin) | 5.0 | 5.0 | 5.0 | 5.0 | 9.0 | 5.0 | 5.0 |
|  |  | Second resin (mass %) (relative to 100 mass % of reinforcing fibers) | 30 | 30 | 30 | 30 | 70 | 30 | 30 |
|  |  | Compatibilizer (mass %) (relative to 100 mass % of reinforcing fibers) | 10 | 10 | 10 | 10 | 18 | 10 | 10 |
|  |  | Compatibilizer (parts) (relative to 100 parts of second resin) | 33 | 33 | 33 | 33 | 26 | 33 | 33 |
|  |  | Reinforcing fiber content in resin molded article (%) | 29 | 29 | 29 | 29 | 26 | 29 | 29 |
|  |  | (a) + (b) (parts) (relative to 100 parts of (a) + (b) + (c)) | 17 | 17 | 17 | 17 | 31 | 17 | 17 |

TABLE 4

|  |  |  | C. E. 1 | C. E. 2 | C. E. 3 | C. E. 4 | C. E. 5 | C. E. 6 | C. E. 7 | C. E. 8 |
|---|---|---|---|---|---|---|---|---|---|---|
| Composition | First resin (a) | Polypropylene (melting point 165° C.) | 35 | 59 | 59 | 76 | 76 | 100 | 100 | 100 |
|  |  | Polyethylene (melting point 120° C.) | 12 | 12 | 12 |  |  |  |  |  |
|  | Reinforcing fiber | Carbon fiber | 6 | 26 | 64 | 10 | 67 | 10 | 50 | 200 |
|  |  | Glass fiber |  |  |  |  |  |  |  |  |
|  | Second resin (b) | PA6 (MP 225° C.) |  |  |  |  |  | 22 | 60 | 20 |
|  |  | PA12 (MP 175° C.) | 23 | 14 | 14 | 10 | 10 |  |  |  |
|  |  | MXD6 (MP 237° C.) |  |  |  |  |  |  |  |  |
|  |  | PBT (MP 232° C.) |  |  |  |  |  |  |  |  |
|  |  | PPS (MP 278° C.) |  |  |  |  |  |  |  |  |
|  |  | PES (MP 288° C.) |  |  |  |  |  |  |  |  |
|  |  | Difference in melting temperature between first resin and second resin (° C.) | 10 | 10 | 10 | 10 | 10 | 60 | 60 | 60 |
|  | Compatibilizer (c) | Maleic anhydride-modified polypropylene | 18 | 3.0 | 3.0 | 14 | 14 | 0.25 | 0.1 | 20 |
|  |  | Maleic anhydride-modified polyethylene | 12 | 12 | 12 |  |  |  |  |  |
|  |  | Maleic anhydride-denatured SEBS |  |  |  |  |  |  |  |  |
|  |  | Total | 106.0 | 126.0 | 164.0 | 110.0 | 167.0 | 132.3 | 210.1 | 340.0 |
| Conditions |  | Melt-kneading temperature (° C.) | 180 | 180 | 180 | 180 | 180 | 230 | 230 | 230 |
|  |  | Injection molding temperature (° C.) | 190 | 190 | 190 | 190 | 190 | 240 | 240 | 240 |

TABLE 4-continued

| | | | C. E. 1 | C. E. 2 | C. E. 3 | C. E. 4 | C. E. 5 | C. E. 6 | C. E. 7 | C. E. 8 |
|---|---|---|---|---|---|---|---|---|---|---|
| Properties | | Flexural modulus (GPa) | 3.5 | 9.2 | 12.1 | 3.9 | 10.5 | 3.8 | 13.1 | 15.2 |
| | | Heat deflection temperature (HDT; °C.) | 82 | 98 | 123 | 91 | 111 | 101 | 135 | 205 |
| | | Fatigue properties retention (%) | 21 | 29 | 35 | 32 | 30 | 14 | 15 | 12 |
| Properties | First domain | Area percentage (relative to total domains) | 18 | 10 | 10 | 6 | 5 | 11 | 15 | 11 |
| | | Domain diameter (μm) | 0.05 | 0.04 | 0.04 | 0.04 | 0.04 | 40 | 2.1 | 0.04 |
| | Second domain A | Area percentage (relative to total domains) | — | — | — | — | — | 6 | — | — |
| | | Domain diameter (μm) | — | — | — | — | — | 112 | — | — |
| | Second domain B | Area percentage (relative to total domains) | — | — | — | — | — | — | — | — |
| | | Domain diameter (μm) | — | — | — | — | — | — | — | — |
| | | Gel fraction (%) | — | — | — | — | — | — | — | — |
| | | Number of peaks in distribution of distances between fibers | 1 | 1 | 1 | 1 | 1 | 1 | 1 | 1 |
| | | Presence of coating layer | present | present | present | present | present | present | present | absent |
| | | Average fiber length (mm) | 0.1 | 0.2 | 0.1 | 0.1 | 0.2 | 0.1 | 0.1 | 0.2 |
| Remarks | | Reinforcing fibers (parts) (relative to 100 parts of first resin) | 13 | 37 | 90 | 13 | 88 | 10 | 50 | 200 |
| | | Second resin (parts) (relative to 100 parts of first resin) | 49 | 20 | 20 | 13 | 13 | 22 | 60 | 20 |
| | | Compatibilizer (parts) (relative to 100 parts of first resin) | 64 | 21 | 21 | 18 | 18 | 0.3 | 0.1 | 20 |
| | | Second resin (mass %) (relative to 100 mass % of reinforcing fibers) | 383 | 54 | 22 | 100 | 15 | 220 | 120 | 10 |
| | | Compatibilizer (mass %) (relative to 100 mass % of reinforcing fibers) | 500 | 58 | 23 | 140 | 21 | 2.5 | 0.2 | 10 |
| | | Compatibilizer (parts) (relative to 100 parts of second resin) | 130 | 107 | 107 | 140 | 140 | 1.1 | 0.2 | 100 |
| | | Reinforcing fiber content in resin molded article (%) | 5.7 | 21 | 39 | 9.1 | 40 | 7.6 | 24 | 59 |
| | | (a) + (b) (parts) (relative to 100 parts of (a) + (b) + (c)) | 53 | 29 | 29 | 24 | 24 | 18 | 38 | 29 |

TABLE 5

| | | | C. E. 9 | C. E. 10 | C. E. 11 | C. E. 12 | C. E. 13 | C. E. 14 | C. E. 15 | C. E. 16 |
|---|---|---|---|---|---|---|---|---|---|---|
| Composition | First resin (a) | Polypropylene (MP 165° C.) | 100 | 50 | 49 | 100 | 100 | 100 | 100 | 100 |
| | | Polyethylene (MP 120° C.) | | | | | | | | |
| | Reinforcing fiber | Carbon fiber | 25 | 20 | 40 | 12.5 | 50 | 50 | 50 | 50 |
| | | Glass fiber | | | | | | | | |
| | Second resin (b) | PA6 (MP 225° C.) | 5.0 | 10 | 0.5 | 25 | 4.0 | 45 | 4.0 | 45 |
| | | PA12 (MP 175° C.) | | | | | | | | |
| | | MXD6 (MP 237° C.) | | 15 | 0.5 | | | | | |
| | | PBT (MP 232° C.) | | | | | | | | |
| | | PPS (MP 278° C.) | | | | | | | | |
| | | PES (MP 288° C.) | | | | | | | | |
| | | Difference in melting temperature between first resin and second resin (° C.) | 60 | 72 | 72 | 60 | 60 | 60 | 60 | 60 |
| | Compatibilizer (c) | Maleic anhydride-modified polypropylene | 10 | 25 | 10 | 0.25 | 0.8 | 12 | 12 | 0.8 |
| | | Maleic anhydride-modified polyethylene | | | | | | | | |
| | | Maleic anhydride-denatured SEBS | | | | | | | | |
| | | Total | 140.0 | 120.0 | 100.0 | 137.8 | 154.8 | 207.0 | 166.0 | 195.8 |
| Conditions | | Melt-kneading temperature (° C.) | 230 | 230 | 230 | 230 | 230 | 230 | 230 | 230 |
| | | Injection molding temperature (° C.) | 240 | 240 | 240 | 240 | 240 | 240 | 240 | 240 |
| Properties | | Flexural modulus (GPa) | 9.1 | 8.5 | 11.5 | 4.8 | 12.1 | 13.2 | 8.8 | 12.8 |
| | | Heat deflection temperature (HDT; °C.) | 98 | 81 | 132 | 75 | 141 | 149 | 138 | 141 |
| | | Fatigue properties retention (%) | 38 | 41 | 21 | 44 | 18 | 33 | 12 | 15 |
| Properties | First domain | Area percentage (relative to total domains) | 5 | 5 | — | 5 | 2.8 | 3 | 2 | — |
| | | Domain diameter (μm) | 0.04 | 0.04 | — | 0.04 | 0.04 | 0.04 | 0.04 | — |

TABLE 5-continued

| | | C. E. | | | | | | | |
|---|---|---|---|---|---|---|---|---|---|
| | | C. E. 9 | C. E. 10 | C. E. 11 | C. E. 12 | C. E. 13 | C. E. 14 | C. E. 15 | C. E. 16 |
| | Second domain A — Area percentage (relative to total domains) | — | — | — | — | — | — | — | — |
| | Domain diameter (μm) | — | — | — | — | — | — | — | — |
| | Second domain B — Area percentage (relative to total domains) | — | 12 | — | 12 | — | 7 | — | 16 |
| | Domain diameter (μm) | — | 2381 | — | 2159 | — | 2214 | — | 2374 |
| | Gel fraction (%) | — | — | — | — | — | — | — | — |
| | Number of peaks in distribution of distances between fibers | 1 | 1 | 1 | 1 | 1 | 1 | 1 | 1 |
| | Presence of coating layer | present | present | absent | absent | present | present | absent | present |
| | Average fiber length (mm) | 0.1 | 0.2 | 0.2 | 0.1 | 0.1 | 0.1 | 0.2 | 0.1 |
| Remarks | Reinforcing fibers (parts) (relative to 100 parts of first resin) | 25 | 40 | 82 | 13 | 50 | 50 | 50 | 50 |
| | Second resin (parts) (relative to 100 parts of first resin) | 5.0 | 50 | 2.0 | 25 | 4.0 | 45 | 4.0 | 45 |
| | Compatibilizer (parts) (relative to 100 parts of first resin) | 10 | 50 | 20 | 0.3 | 0.8 | 12 | 12 | 0.8 |
| | Second resin (mass %) (relative to 100 mass % of reinforcing fibers) | 20 | 125 | 2.5 | 200 | 8.0 | 90 | 8.0 | 90 |
| | Compatibilizer (mass %) (relative to 100 mass % of reinforcing fibers) | 40 | 125 | 25 | 2.0 | 1.6 | 24 | 24 | 1.6 |
| | Compatibilizer (parts) (relative to 100 parts of second resin) | 200 | 100 | 1000 | 1.0 | 20 | 27 | 300 | 1.8 |
| | Reinforcing fiber content in resin molded article (%) | 18 | 17 | 40 | 9.1 | 32 | 24 | 30 | 26 |
| | (a) + (b) (parts) (relative to 100 parts of (a) + (b) + (c)) | 13 | 50 | 18 | 20 | 4.6 | 36 | 14 | 31 |

The details of the materials in Tables 1 to 5 are as follows.

First Resin polypropylene (NOVATEC (trade name) PP MA3 manufactured by Japan Polypropylene Corporation; melting point 165° C.)

polyethylene (ULTZEX 20100J, manufactured by Prime Polymer Co., Ltd.; melting point 120° C.)

Reinforcing Fiber carbon fiber (surface-treated, chopped carbon fiber TORAYCA (trade name) manufactured by Toray Industries, Inc.; average fiber length 20 mm, average diameter 7 μm)

glass fiber (RS 240 QR-483 manufactured by Nitto Boseki Co., Ltd., surface-treated with a silica-based surface treatment agent).

Second Resin specific resin A:

aliphatic polyamide (aliphatic PA)

PA6 (nylon 6, Zytel (trade name) 7331) manufactured by DuPont; melting point 225° C.)

PA12 (nylon 12, Rilsamid manufactured by ARKEMA K.K.; melting point 175° C.)

aromatic polyamide (aromatic PA)

MXD6 (MXD6 manufactured by MITSUBISHI GAS CHEMICAL COMPANY, INC.; melting point 237° C.)

specific resin B:

PBT (polybutylene terephthalate, NOVADURAN 5010R3-2 manufactured by Mitsubishi Engineering-Plastics Corporation; melting point 232° C.)

specific resin C:

PPS (polyphenylene sulfide, FZ-2100 manufactured by DIC Corporation; melting point 278° C.)

PES (polyethersulfone, SUMIKAEXCEL 3600G manufactured by Sumitomo Chemical Company, Limited; melting point 288° C.) Compatibilizer maleic anhydride-modified polypropylene (UMEX (trade name) 110TS manufactured by Sanyo Chemical Industries, Ltd)

maleic anhydride-modified polyethylene (MODIC M142 manufactured by Mitsubishi Chemical Corporation)

maleic anhydride-denatured SEBS (FG polymer manufactured by Kraton Corporation)

From the above-described results, it has been found that fatigue properties retention in Examples is better than that in Comparative Examples. In other words, it has been found that the resin molded articles in the Examples have improved cycle fatigue properties compared with those in Comparative Examples.

Figure 4:
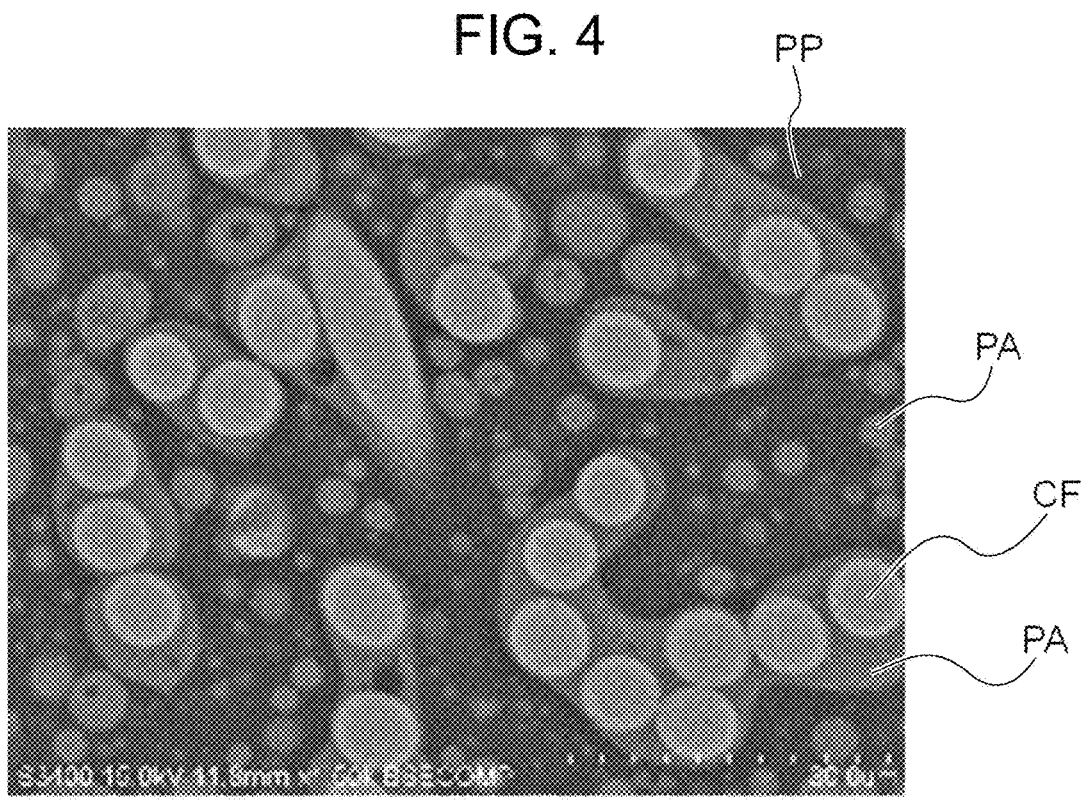
FIG. 4 is an image of an exemplary cross section of the resin molded article according to the present exemplary embodiment.

Here, an exemplary image of a cross section of the resin molded article in Examples is shown in FIG. 4. The image in FIG. 4 is a SEM image of a cross section of the injection molded article cut in a direction perpendicular to the resin flow direction. The cross section is near a portion that had been in contact with the runner, which has been cut and removed from the injection molded article. In FIG. 4, PP denotes polypropylene, PA denotes polyamide, and CF denotes carbon fiber. As shown in FIG. 4, it has been found that domains formed of polyamide are formed in polypropylene in the resin molded articles in Examples and that such domains include domains formed of only the polyamide (first domains) and domains (second domains) in which at least a portion of the polyamide covers the periphery of the carbon fibers. It has been found that the second domains include a domain (second domain A) containing one carbon fiber and a domain (second domain B) containing plural carbon fibers ranged.

Figure 5:
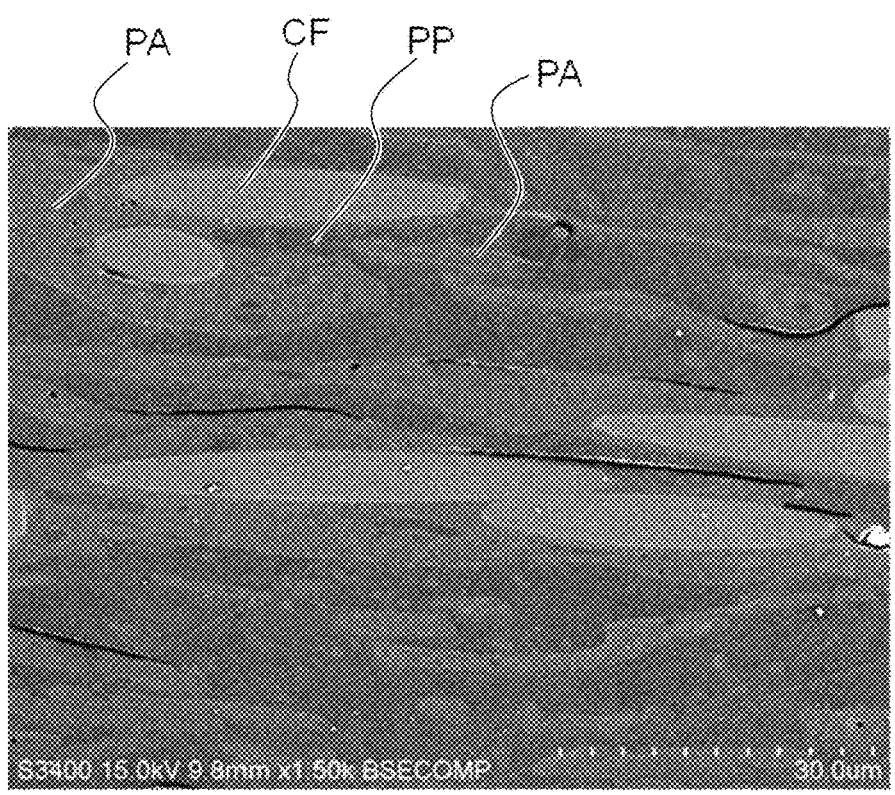
FIG. 5 is an image of another exemplary cross section of the resin molded article according to the exemplary embodiment.

An exemplary image of another cross section of the resin molded article in Example is shown in FIG. 5. The image in FIG. 5 is a SEM image of a cross section of the injection molded article cut in a direction parallel to the resin flow direction. The cross section is near a portion that had been in contact with the runner, which has been cut and removed from the injection molded article. As in FIG. 4, PP denotes polypropylene, PA denotes polyamide, and CF denotes carbon fiber in FIG. 5. As shown in FIG. 5, it has been found that domains formed of polyamide are formed in polypropylene in the resin molded articles in Examples and that such domains include domains formed of only the polyamide (first domains) and domains (second domains) in which at least a portion of the polyamide covers the periphery of the carbon fibers. It has been found that the second domains include a domain (second domain A) containing one carbon fiber and a domain (second domain B) containing plural carbon fibers ranged.

The molded articles produced in Examples are analyzed by the already described method. It has been confirmed that a layer formed of the compatibilizer used (e.g., maleic anhydride-modified polypropylene layer) is present between the coating layer and the first resin, in other words, a compatibilizer layer is formed on the surface of the coating layer.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A resin molded article comprising:
   a first resin formed of a polyolefin;
   reinforcing fibers;
   a second resin selected from a group consisting of a resin containing at least one of an amide bond and an imide bond, a resin containing an ester bond, and a resin having a linking group containing a sulfur atom, an absolute value of difference in melting temperature between the first resin and the second resin being 130° C. or lower; and
   a compatibilizer,
   wherein the compatibilizer is a resin that enhances affinity between the first resin and the second resin,
   at least a portion of the second resin forms domains in the first resin,
   the domains comprise
      first domains that do not contain the reinforcing fibers, and
      second domains that contain the reinforcing fibers and that include a coating layer formed of at least a portion of the second resin on a periphery of the reinforcing fibers, and
   the second domains comprise
      a second domain A containing one reinforcing fiber of the reinforcing fibers, and
      a second domain B containing two or more reinforcing fibers of the reinforcing fibers.

2. The resin molded article according to claim 1, wherein the first domains have a domain diameter of 0.1 µm or more and 20 µm or less,
   the second domain A has a domain diameter of 10 µm or more and 80 µm or less, and
   the second domain B has a domain diameter of 80 µm or more and 2,000 µm or less.

3. The resin molded article according to claim 1, wherein the first domains have a domain diameter of 0.1 µm or more and 20 µm or less, and the area percentage of the first domains is 0.1% or more and 50% or less relative to a total area of the domains formed in the first resin.

4. The resin molded article according to claim 1, wherein the second resin is at least one resin selected from polyamides and polyesters.

5. The resin molded article according to claim 1, wherein the reinforcing fibers include at least one type of fiber selected from carbon fibers and glass fibers.

6. The resin molded article according to claim 1, wherein the reinforcing fibers have a fiber length of 0.1 mm or more and 30 mm or less.

7. The resin molded article according to claim 1, wherein the compatibilizer is a modified polyolefin, wherein the modified polyolefin includes a polyolefin in which a modified portion having a carboxy group, a carboxylic anhydride residue, a carboxylate residue, an imino group, an amino group, or an epoxy group is introduced.

8. The resin molded article according to claim 1, wherein an amount of the second resin is 5 parts by mass or more and 50 parts by mass or less relative to 100 parts by mass of the first resin, and an amount of the compatibilizer is 1 part by mass or more and 10 parts by mass or less relative to 100 parts by mass of the first resin.

9. The resin molded article according to claim 1, wherein an amount of the second resin is 5 mass % or more and 100 mass % or less relative to the mass of the reinforcing fibers.

10. The resin molded article according to claim 1, wherein an amount of the compatibilizer is 0.1 mass % or more and 30 mass % or less relative to the mass of the reinforcing fibers.

11. The resin molded article according to claim 1, wherein an amount of the compatibilizer is 0.1 parts by mass or more and 50 parts by mass or less relative to 100 parts by mass of the second resin.

12. A resin molded article comprising:
    a first resin formed of a polyolefin;
    reinforcing fibers;
    a second resin selected from a group consisting of a resin containing at least one of an amide bond and an imide bond, a resin containing an ester bond, and a resin having a linking group containing a sulfur atom, an absolute value of difference in melting temperature between the first resin and the second resin being 130° C. or lower; and
    a compatibilizer,
    wherein the compatibilizer is a resin that enhances affinity between the first resin and the second resin,
    at least a portion of the second resin forms domains in the first resin,
    the domains comprise
       first domains that do not contain the reinforcing fibers, and
       second domains that contain the reinforcing fibers and that include a coating layer formed of at least a portion of the second resin on a periphery of the reinforcing fibers, and
    a gel fraction of the resin molded article is 10% or more and 60% or less.

13. The resin molded article according to claim 12, wherein the first domains have a domain diameter of 0.1 µm or more and 20 µm or less,
    the second domains comprise a second domain A containing one reinforcing fiber of the reinforcing fibers, and a second domain B containing two or more reinforcing fibers of the reinforcing fibers, the second domain A has a domain diameter of 10 μm or more and 80 μm or less, and the second domain B has a domain diameter of 80 μm or more and 2,000 μm.

14. The resin molded article according to claim 12, wherein the first domains have a domain diameter of 0.1 μm or more and 20 μm or less, and an area percentage of the first domains is 0.1% or more and 50% or less relative to a total area of the domains formed in the first resin.

15. The resin molded article according to claim 12, wherein the reinforcing fibers have a fiber length of 0.1 mm or more and 30 mm or less.

16. A resin molded article comprising:

a first resin formed of a polyolefin;

reinforcing fibers;

a second resin selected from a group consisting of a resin containing at least one of an amide bond and an imide bond, a resin containing an ester bond, and a resin having a linking group containing a sulfur atom, an absolute value of difference in melting temperature between the first resin and the second resin being 130° C. or lower; and a compatibilizer, wherein the compatibilizer is a resin that enhances affinity between the first resin and the second resin, at least a portion of the second resin forms domains in the first resin, the domains comprise first domains that do not contain the reinforcing fibers, and second domains that contain the reinforcing fibers and that include a coating layer formed of at least a portion of the second resin on a periphery of the reinforcing fibers, and a frequency distribution curve of distances between adjacent reinforcing fibers of the reinforcing fibers has at least two local maximum values.

17. The resin molded article according to claim 16, wherein the first domains have a domain diameter of 0.1 μm or more and 20 μm or less, the second domains comprise a second domain A containing one of the reinforcing fibers, and a second domain B containing two or more of the reinforcing fibers, the second domain A has a domain diameter of 10 μm or more and 80 μm or less, and the second domain B has a domain diameter of 80 μm or more and 2,000 μm or less.

18. The resin molded article according to claim 16, wherein the first domains have a domain diameter of 0.1 μm or more and 20 μm or less, and an area percentage of the first domains is 0.1% or more and 50% or less relative to a total area of the domains formed in the first resin.

19. The resin molded article according to claim 16, wherein the reinforcing fibers have a fiber length of 0.1 mm or more and 30 mm or less.

* * * * *